United States Patent
Chavez-Pirson et al.

(10) Patent No.: US 6,778,319 B2
(45) Date of Patent: Aug. 17, 2004

(54) SIDE-PUMPED MULTI-PORT OPTICAL AMPLIFIER AND METHOD OF MANUFACTURE USING FIBER DRAWING TECHNOLOGIES

(75) Inventors: Arturo Chavez-Pirson, Tucson, AZ (US); Sergio Brito Mendes, Tucson, AZ (US); Shibin Jiang, Tucson, AZ (US); Yushi Kaneda, Tucson, AZ (US); Thomas Nikolajsen, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 128 days.

(21) Appl. No.: 09/951,194

(22) Filed: Sep. 10, 2001

(65) Prior Publication Data

US 2003/0048524 A1 Mar. 13, 2003

(51) Int. Cl.[7] .............................................. H01S 3/00
(52) U.S. Cl. ................ 359/333; 359/337.1; 359/337.4; 359/341.32; 385/129
(58) Field of Search ............................. 359/333, 337.1, 359/337.4; 385/1–145

(56) References Cited

U.S. PATENT DOCUMENTS

| | | | |
|---|---|---|---|
| 4,889,401 A | * 12/1989 | Klement et al. | ............. 385/131 |
| 5,048,026 A | 9/1991 | Shaw et al. | ..................... 372/6 |
| 5,134,672 A | * 7/1992 | Imoto et al. | .................. 385/16 |
| 5,194,079 A | * 3/1993 | Tumminelli et al. | .......... 65/386 |
| 5,291,575 A | * 3/1994 | Yanagawa et al. | .......... 385/132 |
| 5,365,538 A | 11/1994 | Tumminelli et al. | .......... 372/66 |
| 5,491,581 A | * 2/1996 | Roba | ....................... 359/341.3 |
| 5,491,708 A | * 2/1996 | Malone et al. | ................ 372/41 |
| 5,566,196 A | * 10/1996 | Scifres | ........................... 372/6 |
| 5,646,773 A | 7/1997 | Injeyan et al. | ............... 359/337 |
| 5,774,488 A | 6/1998 | Kmetec | ........................ 372/69 |
| 5,854,865 A | 12/1998 | Goldberg | ..................... 385/31 |
| 5,877,890 A | * 3/1999 | Snitzer | ..................... 359/337.5 |
| 5,963,700 A | * 10/1999 | Kato et al. | ................... 385/127 |
| 6,043,929 A | 3/2000 | Delavaux | ..................... 359/337 |

(List continued on next page.)

FOREIGN PATENT DOCUMENTS

| | | | | |
|---|---|---|---|---|
| EP | 0496603 A1 | * | 7/1992 | ............. H01S/3/17 |
| JP | 04253037 A | * | 9/1992 | ............. G02F/1/35 |

OTHER PUBLICATIONS

C.L. Bonner, Double–Clad Structures and Proximity Coupling for Diode–Bar–Pumped Planar Waveguide Lasers, IEEE Journal of Quantum Electronics, Feb. 2000, vol. 36, No. 2.

*Primary Examiner*—Nelson Moskowitz
*Assistant Examiner*—Stephen Cunningham
(74) *Attorney, Agent, or Firm*—Eric A. Gifford

(57) ABSTRACT

A multi-port optical amplifier chip has an inner cladding layer sandwiched between a pair of outer cladding layers, a plurality of active core elements disposed substantially within the inner cladding layer to receive optical signals at respective input ports and transmit amplified optical signals at respective output ports, a pair of reflecting surfaces on opposing sides of the inner cladding and at least one pump source. The pump source directs pump light into the inner cladding layer where it is confined to bounce back-and-forth across the active core elements thereby enhancing the absorption of pump light into the core elements, hence increasing gain. Greater than 5 dB over the C-band (1930 nm–1965 nm) in less than 10 cm is expected with a phosphate glass material co-doped with greater than 2 weight percent Erbium and 10 weight percent Ytterbium. A number of fiber drawing based approaches are contemplated for manufacturing the amplifiers to achieve this performance and reduce cost.

16 Claims, 18 Drawing Sheets

U.S. PATENT DOCUMENTS

| | | | |
|---|---|---|---|
| 6,069,907 A | 5/2000 | Chang | 372/34 |
| 6,151,160 A * | 11/2000 | Ma et al. | 359/337.12 |
| 6,181,466 B1 * | 1/2001 | Franzoso et al. | 359/341.3 |
| 6,229,939 B1 | 5/2001 | Komine | 385/29 |
| 6,246,821 B1 * | 6/2001 | Hemken et al. | 385/101 |
| 6,288,833 B1 * | 9/2001 | Kasamatsu | 359/333 |
| 6,594,420 B1 * | 7/2003 | Lange et al. | 385/36 |
| 2002/0021486 A1 * | 2/2002 | Lange et al. | 359/333 |

\* cited by examiner

FIG. 2a
FIG. 2b
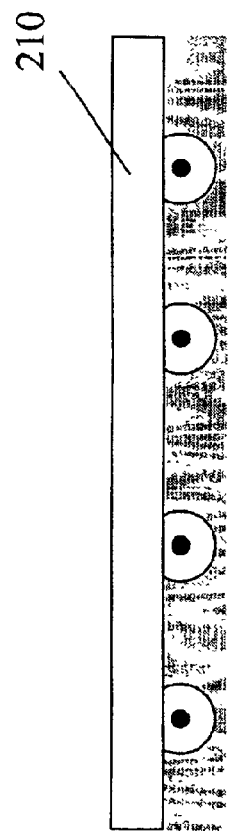
FIG. 2c
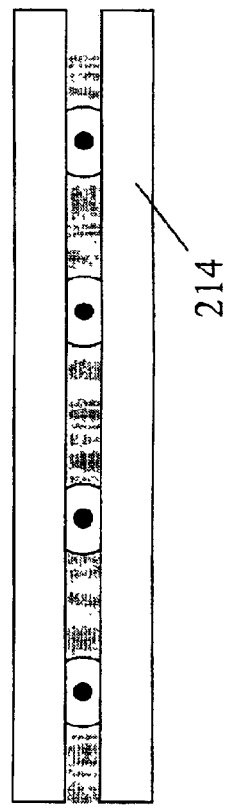
FIG. 2d

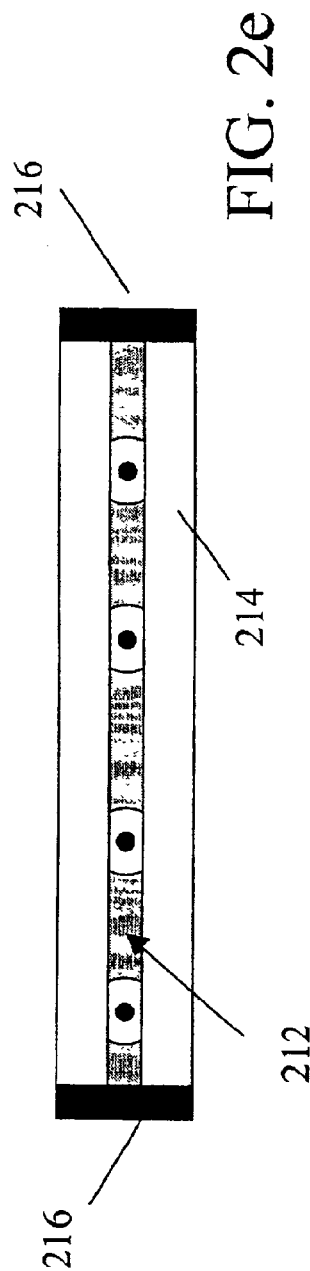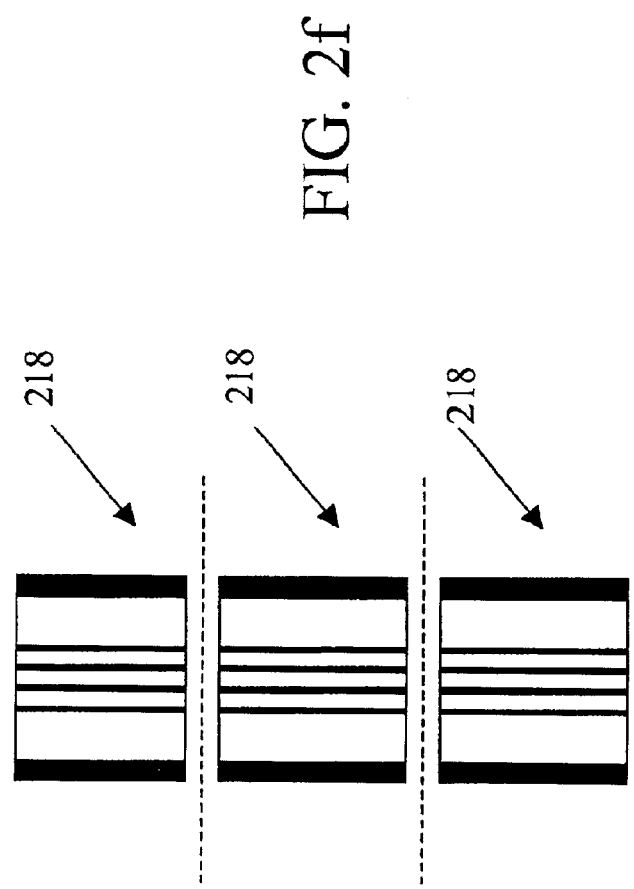

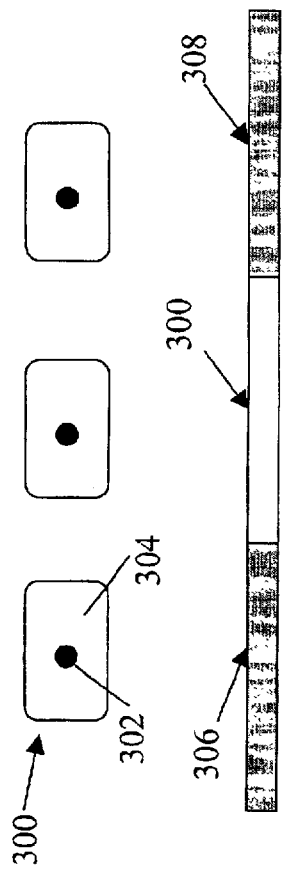
FIG. 3a
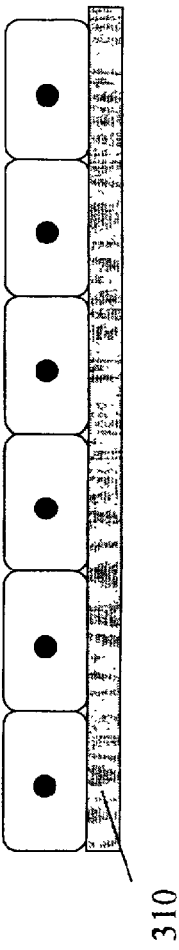
FIG. 3b
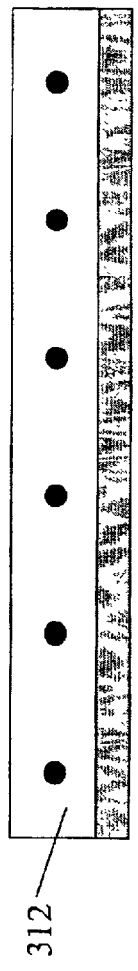
FIG. 3c
FIG. 3d
FIG. 3e

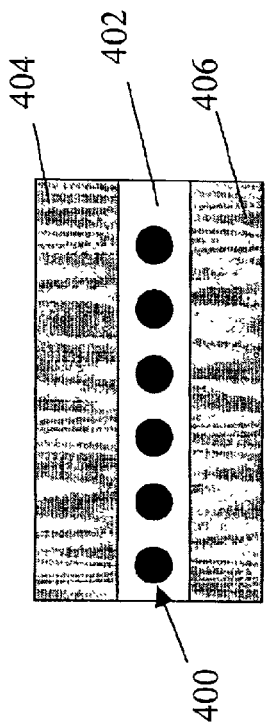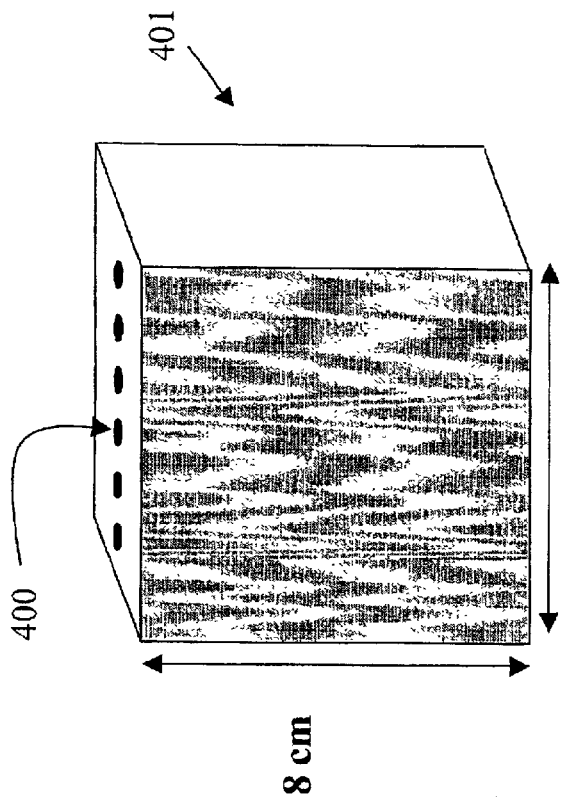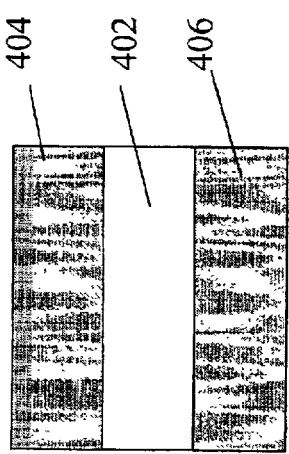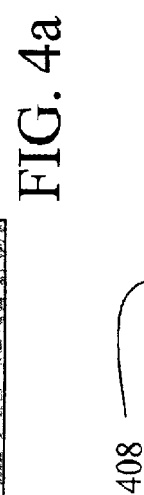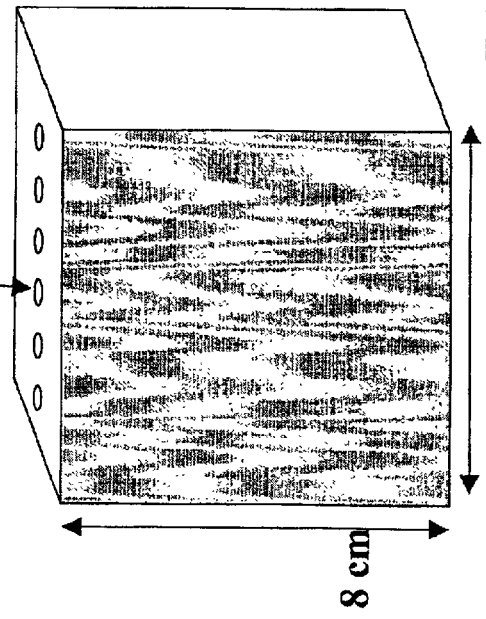
FIG. 4a  FIG. 4b  FIG. 4c  FIG. 4d

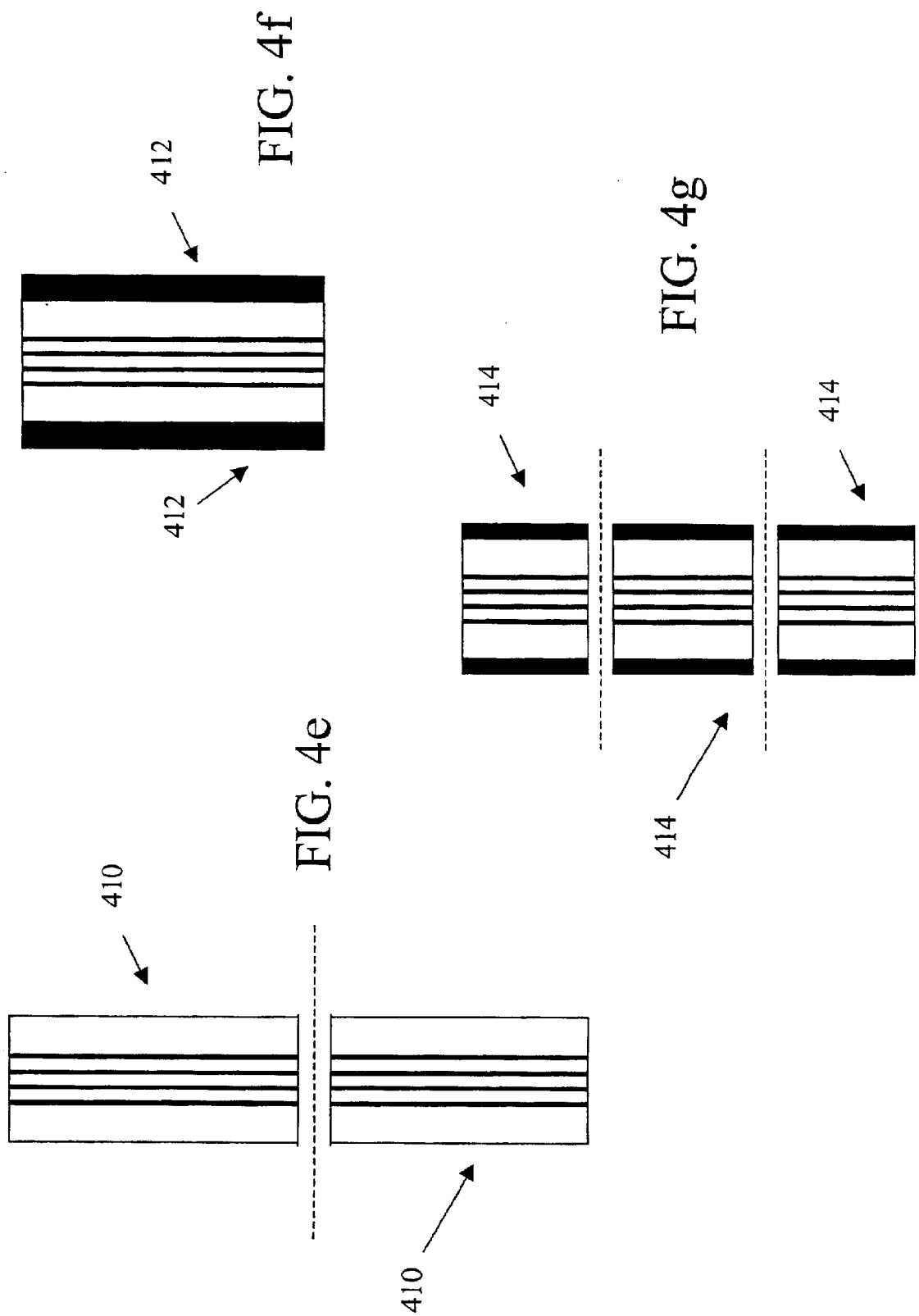

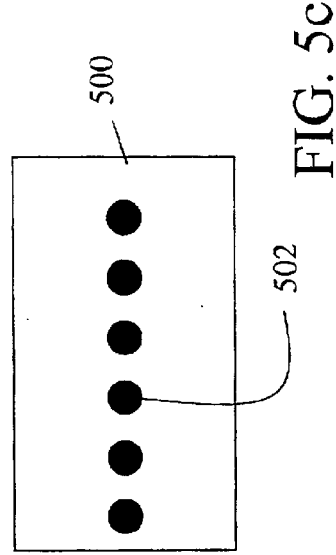
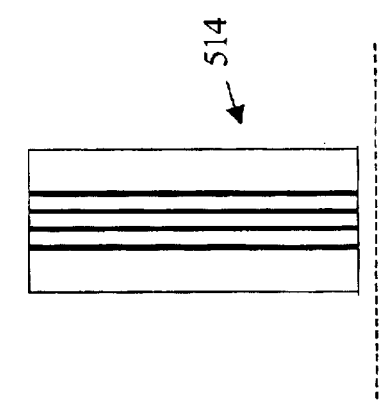
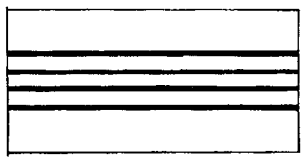
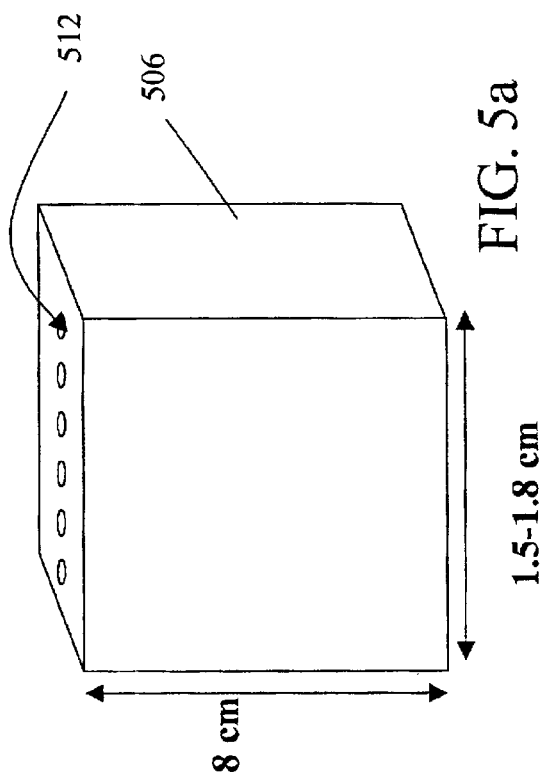
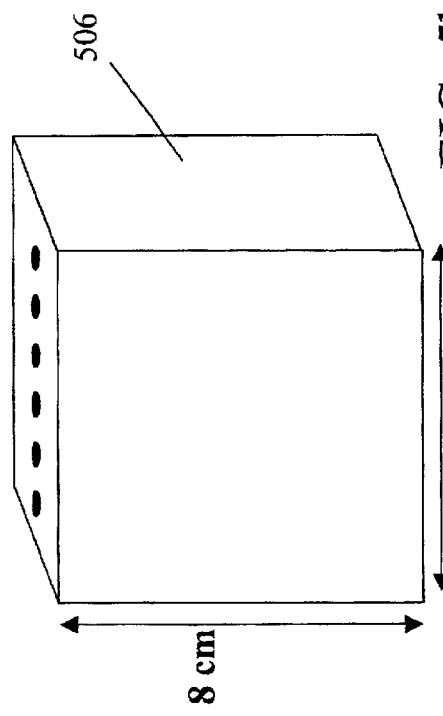
FIG. 5c
FIG. 5d
FIG. 5a
FIG. 5b

SIDE-PUMPED MULTI-PORT OPTICAL AMPLIFIER AND METHOD OF MANUFACTURE USING FIBER DRAWING TECHNOLOGIES

BACKGROUND

1. Field of Invention

This invention relates to optical amplifiers, and more particularly to multi-port optical amplifiers for optical communications systems.

2. Discussion of Related Art

Optical amplifiers are considered enabling components for bandwidth expansion in dense wavelength division multiplexed (DWDM) fiber optic communications systems. In particular, silica glass Erbium Doped Fiber Amplifiers (EDFA) exhibit many desirable attributes including high gain, low noise, negligible crosstalk and intermodulation distortion, bit-rate transparency, and polarization insensitive gain. These properties make optical fiber amplifiers superior to semiconductor devices as amplifiers in fiber optic systems. Moreover, fiber-based amplifiers do not require an optical-electrical-optical (OEO) interface, in which the optical signal is first converted into an electrical signal for amplification and that back into an optical signal, as do semiconductor devices.

In a communications system of any significant size, there is typically a distribution network that includes long communication paths and nodes where the network branches. In such a network, amplifiers are required in order to maintain the amplitude of the signal and the integrity of any data in route between a source and destination. For these amplifiers to function properly, the amplifiers must exhibit high small signal gains and/or high output saturation powers.

Application of erbium-doped optical fibers as amplifiers has received considerable attention recently because the characteristic gain bandwidth of these fibers is within the telecommunications window of 1.5 $\mu$m commonly used in fiber optic communications systems. Since the announcement of a single mode $Er^{3+}$ doped fiber amplifier (EDFA) in 1987 at the University of Southampton, enormous research has been performed, and more than 400 U.S. patents have been issued on fiber amplifiers.

To date, erbium fiber amplifiers use erbium doped silica fibers more than one meter long to achieve greater than 20 dB gain near the 1.54 $\mu$m range. More commonly, the length of the erbium doped silica fiber is approximately 10 to 20 meters. The fiber management associated with such lengths is not practical for assembly into integrated optical components. Integration of arrays of EDFAs into low cost compact packages will be necessary for deployment into the metro, access and fiber-to-the home markets. There is a compelling need for integrated optical components that have an array of high optical gain amplifiers in compact low cost packages.

SUMMARY

In view of the above problems, the present invention provides a compact multi-port EDFA and a method for low-cost manufacturing using fiber-drawing technologies.

This is accomplished with an array of active core elements that are coupled to an array of inputs, such as from telecom fibers or ports from a separate optical component, located at the elements' respective input ports to receive optical signals and coupled to an array of outputs at the elements' respective output ports to deliver amplified optical signals. The array of active core elements are embedded in an inner cladding layer, which together with a pair of outer cladding layers (air or a compatible material with a lower index) define an optical pump waveguide. Pump light is injected into the waveguide either directly into the inner cladding layer from the side through an entrance aperture or via a prism or notch, and confined within the inner cladding layer, which is substantially transparent to the pump wavelength, so that the pump light moves in a transverse direction with respect to the longitudinal orientation of the active core elements. The inner cladding layer serves both to confine the optical signal inside the active core elements and to guide the pump light. The sides of the inner cladding layer are reflective to the pump wavelength so that the pump light illuminates multiple segments of each active core element as the pump light bounces back-and-forth and moves longitudinally down the waveguide. The illumination of each active core element causes stimulated emission, hence amplifying the optical signals passing through the active core elements.

Re-directing any pump light that remains un-absorbed from the first passage through the waveguide longitudinally back up the waveguide can further enhance absorption of the pump light. This process can repeat for as long as there is available pump light. The ends of the inner cladding layer are preferably reflective at the pump wavelength but at least one end must be substantially transmissive at the signal wavelength such that there is efficient input and output coupling of the optical signals. Single pass amplification of the signal requires both input and output ports to be transmissive at the signal wavelength. Double pass amplification of the signal only requires that one port (which acts as both input and output) be transmissive at the signal wavelength, and the opposite end to be reflective for the signal wavelength.

In one particular embodiment, the inner cladding layer is formed from a phosphate glass host. The active core elements are formed by highly doping the phosphate glass host with Ytterbium and Erbium ions, which enhance the absorption of pump light and increase signal gain, respectively. Concentrations of at least 2% weight of Erbium and 10% weight of Ytterbium provide greater than 5 db gain over the C-band (1530–1565 nm) with a length of less than 10 cm.

The use of fiber drawing technology to manufacture the multi-port fiber amplifier is essential to realizing low cost devices. Kilometers of fiber can be drawn and then diced to form many amplifiers at a per unit cost that is a fraction of what could be achieved using standard waveguide fabrication technologies. Fiber drawing also supports the formation of active core elements having the high doping concentrations needed to achieve high gain in short lengths in a glass host that is transparent to the pump wavelength. Furthermore, the active core elements are easily formed with a circular cross section; hence the TE and TM polarization modes are preserved as the signal propagates through the amplifier.

A number of fiber drawing based approaches are contemplated. In a first embodiment, gain fibers including an inner cladding and active core elements are placed in a template structure, polished and sandwiched between a pair of external cladding layers to form the waveguide. Active cylindrical fibers are placed in a regular array pattern that is set by a template such as an array of v- or u-grooves made of a compatible glass. The fibers are fixed into place by small amounts of index-matched epoxy, or fused into place by heating the entire assembly until the interfaces between fiber and groove material merge together. The bonded structure is polished to a desired thickness, leaving a flat top surface. A first outer cladding structure is fixed to this polished surface. The cladding structure provides for optical confinement. The bonded structure is then polished from the other side—leaving a flat bottom surface, and the inner cladding layer of desired thickness. A second outer cladding structure is fixed on this surface completing the waveguide structure. In this embodiment, the fiber's inner cladding layer confines the optical signal inside the core element and the inner cladding layer together with the outer cladding layers guide the pump light.

In a second embodiment, each gain fiber is drawn to have a rectangular cladding around the active core element. Each gain fiber is fusion spliced to an input and/or output telecom fiber or left open-facetted for integration with other optical components. The gain fibers are then bonded together with their claddings together forming the inner cladding layer. In the bonding process, the rectangular fibers are arranged and placed on a bottom outer cladding layer. The assembly is heated, fusing together the cladding of the rectangular gain fibers into a ribbon of fibers. A top outer cladding layer is fixed on the top surface to complete the waveguide with the active cores in the guiding layer.

In a third embodiment, the inner and outer cladding structure and array of active core elements are drawn from a common preform. A preform glass structure is produced consisting of an inner cladding layer sandwiched between two outer cladding glass layers. An array of circular holes is drilled into the rectangular-shaped inner cladding layer following the practices of optical fiber pre-form fabrication. The active cylindrical cores, containing Er-doped glass, are fitted into the holes. The entire assembly is drawn, like an optical fiber. By adjusting the drawing conditions, the entire waveguide structure is produced. Alternatively, the outer cladding structure can be attached to the drawn array structure after the pulling process. In this case, the drawn piece, consisting of the inner cladding layer with active cores, is polished to a desired thickness, and the resulting guiding layer is sandwiched between two outer cladding structures to form the waveguide.

In a fourth embodiment, a single mode waveguide is formed by bonding a layer of active gain material to a layer of inner cladding material. The assembly is diced, stacked and sliced to form the inner cladding layer with the embedded array of active core elements, which is sandwiched between outer cladding layers and drawn like a fiber. The drawn assembly is coated with reflective material and diced into multiple single-mode multi-port amplifiers.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2a through 2f illustrate a first method of manufacturing the multi-port optical amplifier;

FIGS. 3a through 3g illustrate a second method of manufacturing the multi-port optical amplifier;

FIGS. 4a through 4g illustrate another method of manufacturing the multi-port optical amplifier;

FIGS. 5a through 5h illustrate a yet another method of manufacturing the multi-port optical amplifier;

DETAILED DESCRIPTION

Figure 1:
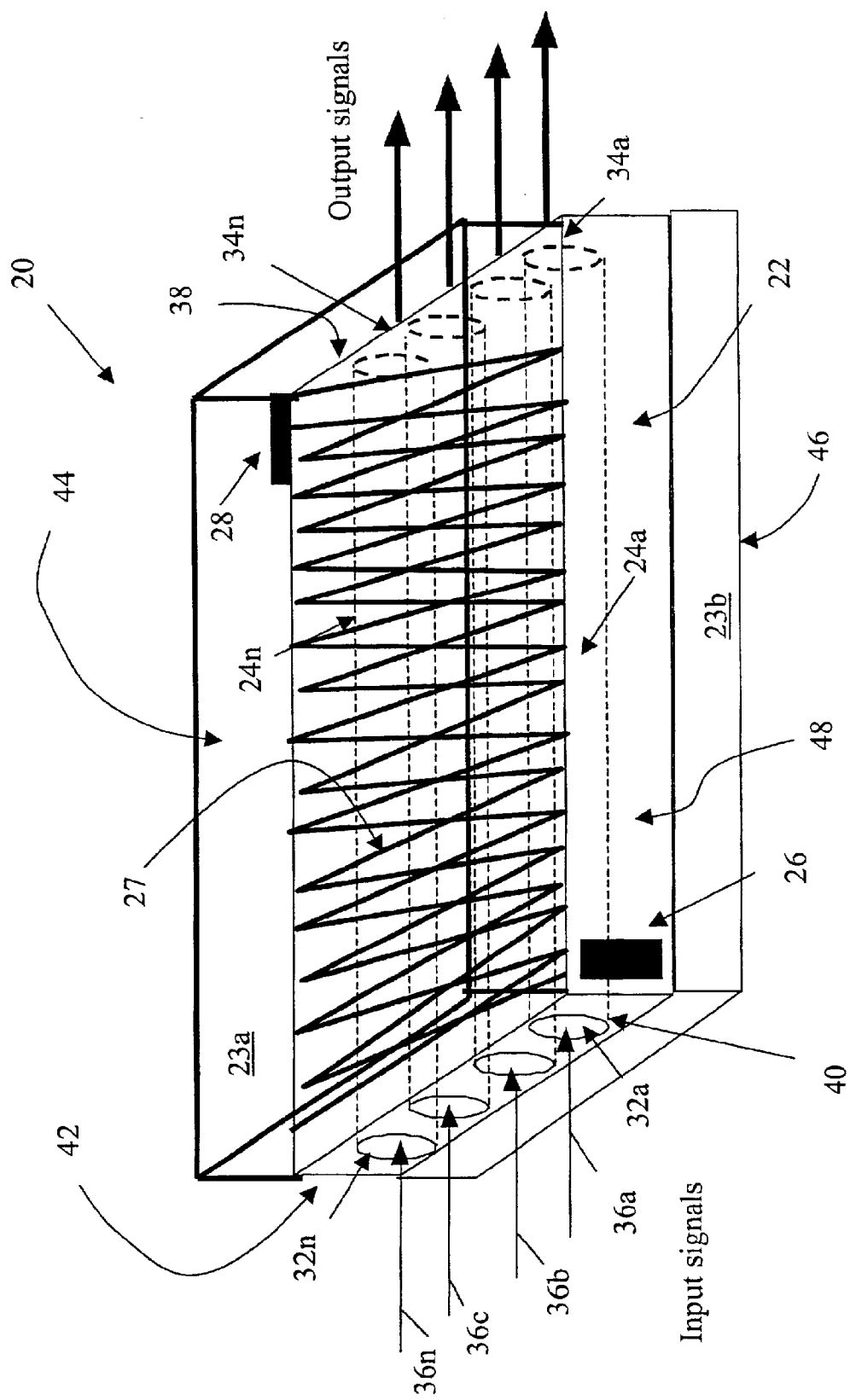
FIG. 1 is a schematic illustration of a multi-port optical amplifier according to a first embodiment of the invention.

FIG. 1 is a schematic illustration of a multi-port optical amplifier 20 according to an embodiment of the invention. Multi-port optical amplifier 20 has an inner cladding layer 22 sandwiched between a pair of outer cladding layers 23a and 23b, which together define a pump waveguide ("waveguide") for confining and guiding pump light within the inner cladding. Multi-port optical amplifier 20 includes a plurality of input ports 32a–32n and a plurality of output ports 34a–34n suitably formed at opposing ends of the amplifier. A plurality of active core elements 24a–24n are arranged longitudinally in inner cladding layer 22 to define optical signal paths between respective pairs of the input and output ports. The inner cladding layer and each of the active core elements form separate signal waveguides for confining respective optical signals inside the active core elements as they travel the optical signal paths. A first pump laser diode 26 and (optionally) a second pump laser diode 28 are positioned to illuminate opposing sides of the waveguide, and, more specifically, inner cladding layer 22, with pump light 27.

In operation, a plurality of optical signals 36a–36n are coupled through input ports 32a–32n into active core elements 24a–24n. The input and output ports may be optically coupled to standard telecomm fibers or directly integrated with other optical components such an arrayed waveguide (AWG). Pump light from pump laser diodes 26 and 28 is coupled into the inner cladding layer 22 where it is confined until it is absorbed through side pumping of the plurality of active core elements 24a–24n. The pump light which passes through or around the first active core element 24a intercepts the second active core element 24b, and so on. The pump light absorbed by active core elements 24a–24n causes a population inversion of the active material in which a greater number of particles in the active material are in an excited state than are in the ground state. The optical signals traveling through the plurality of active core elements causes stimulated emission of light from the active material at substantially the same wavelength as the signal, and substantially coherently with the signal. The signals are thus amplified as they traverse and exit as amplified optical signals at output ports 34a–34n. This amplification is illustrated schematically in FIG. 1 in which thin arrows represent the input optical signals and the corresponding amplified optical signals are represented by thick arrows.

In a preferred embodiment, pump absorption and thus gain is enhanced by forming reflecting surfaces 42 and 48 on opposing sides of the inner cladding layer, which cause the pump light to be reflected back-and-forth in a zigzag pattern down the waveguide traversing each active core element multiple times. To further enhance absorption, reflecting surfaces 38 and 40 can be formed on opposing ends of the inner cladding layer, which cause the pump light to reverse its path and travel back through the waveguide. At least one of these reflective surfaces 38 or 40 must be substantially transmissive at the signal wavelength to input and output couple the optical signals. Single pass amplification of the signal requires both input and output ports to be transmissive at the signal wavelength. Double pass amplification of the signal only requires that one port (which acts as both input and output) be transmissive at the signal wavelength, and the opposite end to be reflective for the signal wavelength. The top and bottom surfaces 44 and 46, respectively, of the outer cladding layers may also be reflective to redirect any pump light that may leak out of the inner cladding layer, in effect forming an "integrating sphere" that absorbs substantially all of the pump light.

The reflecting surfaces may be surfaces that cause specular reflection or diffuse reflection. In some embodiments, the reflecting surfaces may be very rough surfaces relative to the wavelength of the pump light so that it produces predominantly scattered light. The reflecting surface has the effect to redirect at least some of the pump light back towards the plurality of active core elements 24a–24n thus providing another chance for the pump light to be absorbed by the active core elements 24a–24n. In the embodiment illustrated in FIG. 1, the reflecting surface is primarily a specular reflection surface and is a surface of a substantially solid inner cladding layer 22. The reflecting surface may include a reflecting coating. A metal or dielectric reflective coating may be used depending on the particular application. Suitable metal reflecting coatings include aluminum, silver, gold, and suitable dielectric coatings include thin film stacks for high reflection To construct a compact multi-port amplifier, the plurality of active core elements 24a–24n must exhibit a high gain per unit length. Standard Er doped glass provides a gain per unit length of only 0.02–0.2 dB/cm, which would not support sufficient gain in a compact form factor. If the gain of the plurality of active core elements 24 is much less than about 1.5 dB/cm, the required length in order to achieve a useful total gain of typically at least about 3 dB makes it difficult to form a small enough package for a multi-port optical amplifier to be commercially viable. Thus, it is preferable that the gain per unit length of a plurality of active core elements 24 be at least about 1.5 dB/cm.

To achieve the desired gain per unit length, active core elements 24a–24n are formed from a phosphate glass host co-doped with erbium and ytterbium. Hwang et al., Electronics Letters, Vol. 35, No. 12, pp. 1007–09, June 1999 and Jiang et al., Optical Communication Conference, Baltimore, Md., March 7–10, 2000, PD5-1 to PD5-3 describe suitable high gain fibers (the entire contents of both are incorporated herein by reference). A suitable glass composition includes a phosphate glass host that includes the following ingredients by weight percentages: $P_2O_5$ from 30 to 80 percent, $Er_2O_3$ from 2.0 to 12 percent, $Yb_2O_3$ from 5 to 30 percent, $L_2O_3$ from 5 to 30 percent, and MO from 5 to 30 percent, where $L_2O_3$ is selected from the transition metal oxide group consisting of $Al_2O_3$, $B_2O_3$, $Y_2O_3$, $La_2O_3$ and mixtures thereof, and MO is selected from the alkaline earth oxide group consisting of BaO, BeO, MgO, SrO, CaO, ZnO, PbO and mixtures thereof. The phosphate glass composition improves the solubility to erbium and ytterbium ions thereby allowing higher dopant levels than previously deemed practical without raising the upconversion rate. The elevated ytterbium levels in particular greatly enhance the fiber's ability to absorb pump power while the elevated erbium levels enhance the gain per unit length of the fiber.

A number of different configurations and material compositions are possible depending upon the specific application and the method of manufacture (detailed in FIGS. 2–5 below). Inner cladding layer 22 provides three distinct functions. First, the inner cladding layer and active core elements together form signal waveguides (fibers) for confining the optical signals. Second, the inner cladding layer provides a mechanical structure for supporting the array of active core elements. Third, the inner cladding layer and outer cladding layers define a waveguide for confining the pump light in one direction. Fundamentally the inner cladding layer must have an effective refractive index that is lower than that of the active core elements at the pump wavelength and higher than that of the outer cladding layers to form the waveguides. Further, the inner cladding layer must be substantially transparent to the pump wavelength to avoid any absorption of pump light in the inner cladding layer. In some embodiments, the inner cladding layer may comprise multiple components that each performs one or more of these functions. For example, in the case where fibers are drawn and assembled into a waveguide (FIG. 2 below), the inner cladding layer comprises the standard cladding formed around the fiber core, which performs the function of confining the optical signal inside the core, and a glass template that provides the mechanical support and transparent media for guiding the pump light.

A suitable material is the undoped phosphate glass host used to form the active core elements. Other candidate materials for the inner cladding layer include silicate glasses with refractive index that closely match the cladding glass surrounding the active core elements. In the case of drawn fibers assembled in waveguides discussed above, inner cladding materials include Schott glasses N-LLF6, N-PK51.

One may form the inner cladding layer of a material that has a non-uniform refractive index. For example, the material of the inner cladding layer 22 may have a high refractive index at a central point compared to a refractive index proximate a reflecting surface 42 or proximate the top surface 44 or bottom surface 46. The inner cladding layer 22 may have refractive index profiles analogous to refractive index profiles of optical fibers. In an embodiment of the invention, the inner cladding layer 22 may have a step index refractive index profile. The refractive index profiles of the inner cladding layer may be tailored to enhance the total internal reflection of the pump light from the first pump laser diode 26.

Outer cladding layers 23a and 23b are suitably formed from a lower index phosphate glass, a lower index heterogeneous glass such as magnesium fluoride, or a wide variety of silicate glasses produced by Schott including NFK56 (fluorcrowns), N-PK52, and N-BK10 (boron crowns, borosilicates). Alternately, the outer cladding layers can be fused silica or Pyrex glass. Also, it may be possible that the outer cladding layers are provided by the air or atmosphere around the inner cladding layer since air has the lowest refractive index. Furthermore, it may be possible to form the outer cladding layers with a photonic crystal-like structure consisting of different materials that provide the stated function. The layer could be as simple as a one-dimensional dielectric stack of alternating materials or as complicated as a three-dimensional structure with hole or gaps that enable a more perfect containment of the pump light inside the cladding layer The first pump laser diode 26 is selected to emit light at the desired pump frequency selected according to the active medium of the plurality of active core elements 24a–24n. In the case in which erbium or erbium and ytterbium are the active materials, the pump laser diode is selected to emit pump light at about 975–980 nm. The power levels will depend on the type of diode that is chosen; single vs. multi-mode, single emitter or diode bar. For example the state of the art single emitter multi-mode pump laser at 980 nm produces 4 W of optical power. A diode bar may produce 40 W or more. The input pump aperture could vary in dimension depending on the laser type as well as the optics used to couple the pump light. The aperture could be as small as 100-micron or as large as 1 cm if we use a diode bar 1 cm long. Uniformity of illumination could be one reason for using a diode bar, but it may also be desirable to pump the different ports unevenly so that we can optimize the gain for a specific wavelength for a specific port.

In the case of the diode bar, it may or may not be possible to reflect the pump light back-and-forth off the reflective side walls of the inner cladding as described previously depending upon the length of the diode bar and the amplifier. In general, the surface where the diode bar injects pump light must substantially pass pump light and the reflective surfaces must obviously reflect it. To overcome this problem, the entrance facet (entire distance of waveguide length) may be coating with a coating, which passes one linearly polarized light from the pump, but reflects the orthogonal polarization state. By placing a polarization-dependent element, such as a ¼ wave plate, inside the guide (or making use of the birefringence in the material), the polarization state of the return beam is rotated 90 degrees and is reflected by the coating. This technique gives 4 passes of the pump before leaking back into the diode bar. Alternately, the reflecting facets can be angled to allow the pump light to bounce around inside the amplifier in a zigzag pattern—with multiple passes across the cores.

The scope of the invention is not limited to the use of only pump laser diodes, and contemplates that one could choose to use other types of pump sources without departing from the scope and spirit of this invention. Non-imaging optical elements, such as light pipes or conical tapers are suitable for efficient coupling of light from the pump laser diode 26 into the inner cladding layer 22. In another embodiment, fiber-coupled laser diodes transfer high power output from a laser diode bar into a multimode fiber with its output face proximate a side window of the inner cladding layer 22.

The second pump laser diode 28 similarly emits pump light, which propagates both transversely and laterally to side illuminate the plurality of active core elements 24a–24n. Again, pump light which is not absorbed by the plurality of active core elements on the first pass is reflected from the second reflecting surface 48 to re-traverse the inner cladding layer 22 in the transverse and reverse longitudinal direction. Similar to the case with the first pump laser diode 26, the pump light from the second pump laser diode 28 is reflected repeatedly within the inner cladding layer 22 from reflecting surfaces that may include some or all of reflecting surfaces 42, 48, 44 and 46 until substantially all pump light is absorbed through side pumping of the plurality of active core elements 24. Even though it is desirable for substantially all of the pump light to be absorbed by the active core elements 24a–24n, it is beneficial if any of the pump light that is not absorbed on a first pass by the active core elements 24a–24n is redirected back towards the active core elements so that it has a second chance to be absorbed.

Although the embodiment illustrated in FIG. 1 has two pump laser diodes, the scope of the invention is not limited to such a configuration. One may use a single pump light source, or more than two pump light sources without departing from the general scope of the invention. The Applicants have found that two laser diode pump lasers provide good results for optical amplifiers that have many more than four optical gain fibers. Increasing the number of active core elements relative to the number of pump lasers in this way has an advantage of reduced cost.

The waveguide formed by inner cladding layer 22 and outer cladding layers 23a and 23b serves to confine the pump light as it passes back-and-forth across the waveguide. The waveguide is preferably configured to concentrate most of the pump light in the central part of the waveguide where the active core elements lie. If the waveguide can be made thin enough (10 micron or less) and with appropriate cladding index, then the waveguide can be single mode (spatial). Thus the overlap of pump energy with the core will be optimized since the pump profile of the single mode will be concentrated in the central part of the waveguide with little pump light in the areas of the waveguide above and below the cores.

A 10-micron single-mode waveguide may not be cost effective for all applications. In a multimode waveguide, the pump energy is distributed over all the modes of the guide, resulting in a uniform filling of the waveguide area. The overlap of pump energy with the core can be fairly good—roughly the ratio of the waveguide thickness and the core diameter but certainly not optimal. Furthermore, if the waveguide losses are dominated by the interfaces of the inner and outer cladding layers, a multimode guide may have lower propagation losses compared to a single mode guide—and may be preferable in practice from a performance standpoint.

The use of fiber drawing technology to manufacture the multi-port fiber amplifier is essential to realizing low cost devices. Kilometers of fiber can be drawn and then diced to form many amplifiers at a per unit cost that is a fraction of what could be achieved using standard waveguide fabrication technologies. Fiber drawing also supports the formation of active core elements having the high doping concentrations needed to achieve high gain in short lengths in a glass host that is transparent to the pump wavelength. Furthermore, the active core elements are easily formed with a circular cross section; hence the TE and TM polarization modes are preserved as the signal propagates through the amplifier.

In a first embodiment, active fibers are drawn using standard fiber drawing techniques and then assembled into a fiber amplifier array within a waveguide. As shown in FIG. 2a, a template 200 is formed with an array of v- or u-grooves 202 and made of a glass that is compatible with the functions of the inner cladding layer. Active cylindrical fibers 204 having a core 208 and a cladding 206, which is compatible with the functions of the inner cladding layer, are placed in a regular array pattern that is set by the array of u-grooves as depicted in FIG. 2b. The fibers are fixed into place by small amounts of index-matched epoxy, or fused into place by heating the entire assembly until the interfaces between fiber and groove material merge together. As shown in FIG. 2c, the bonded structure is polished to a desired thickness, leaving a flat top surface on which an outer cladding layer 210 is fixed. As shown in FIG. 2d, the bonded structure is then polished from the other side—leaving a flat bottom surface, and an inner cladding layer 212 of desired thickness. A second outer cladding layer 214 is fixed on this surface completing the waveguide structure. The sides of the inner cladding layer are then coated with a reflective material to form the pair of reflecting surfaces 216 on opposing sides of the active fibers as depicted in FIG. 2e. This assembly is diced to form a plurality of multi-port amplifiers 218 as illustrated in FIG. 2f.

Figure 3F:
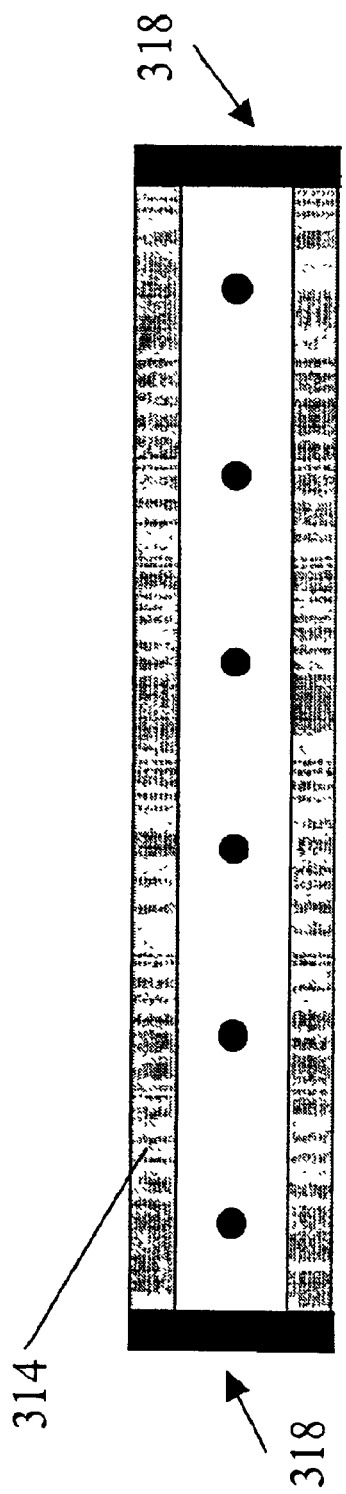
Figure 3G:
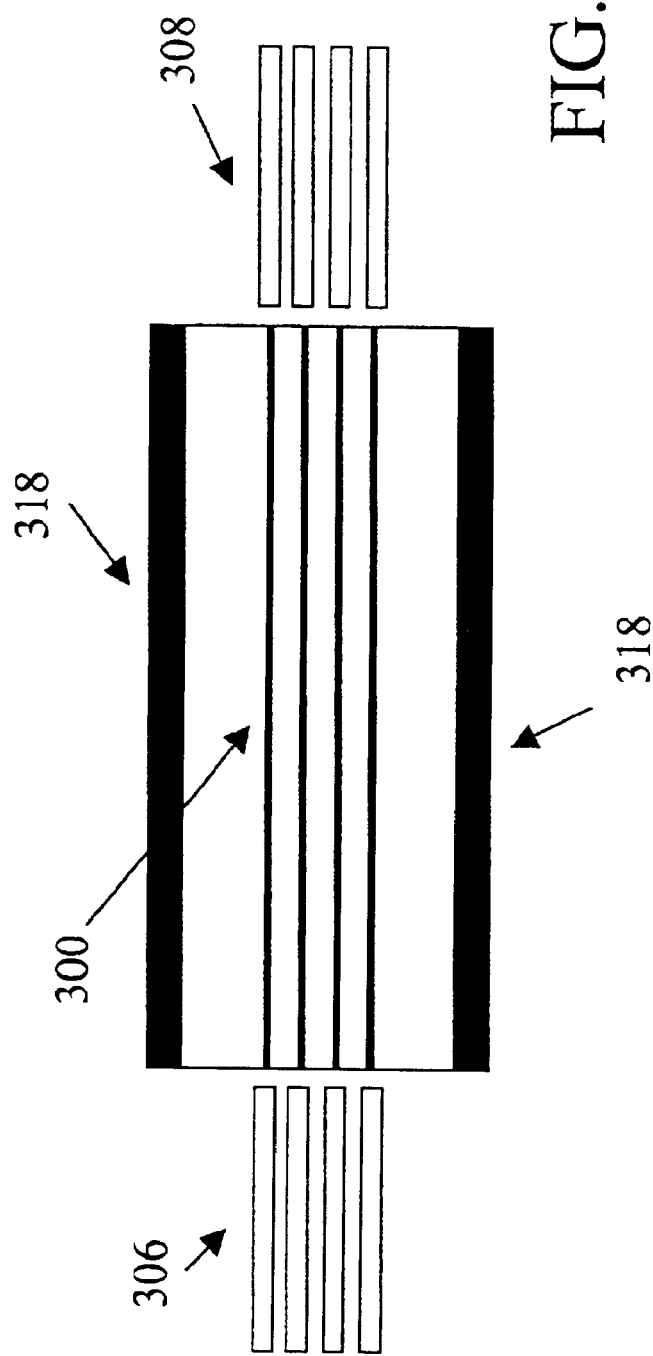

In a second embodiment, active fibers are drawn with a rectangular cladding, individually fused to standard telecom fibers, fused together to form the inner cladding and sandwiched between outer cladding layers. As shown in FIG. 3a, an active fiber 300 having a circular core 302 and a rectangular cladding 304 is drawn using standard fiber drawing techniques and diced into a large number of fiber segments. As shown in FIG. 3b, the rectangular active fibers 300 are fusion-spliced to input and output telecom fibers 306 and 308, respectively, which are typically silica fibers. A silicate partial outer cladding may be formed on the top and bottom of each active fiber to facilitate the fusion splice and to strengthen the joint. As shown in FIG. 3c, the rectangular fibers 300 are arranged and placed on a bottom outer cladding layer 310. As shown in FIG. 3d, the assembly is heated, fusing together the claddings 304 of the rectangular fibers to form an inner cladding layer 312 with an array of circular cores 302. As shown in FIG. 3e, a top outer cladding layer 314 is fixed on the top surface to complete the waveguide structure. The sides of the inner cladding layer are then coated with a reflective material to form the pair of reflecting surfaces 318 on opposing sides of the active fibers (FIG. 3f). The final multiport amplifier is illustrated in FIG. 3g.

In a third embodiment, the entire amplifier structure (except the pump) is drawn from a single preform 401, which has been specially fabricated to have an array of active core elements 400 embedded in an inner cladding layer 402 sandwiched between outer cladding layers 404 and 406. As shown in FIG. 4a, a preform glass structure is produced consisting of inner cladding layer 402 sandwiched between outer cladding layers 404 and 406. As shown in FIG. 4b, an array of circular holes 408 is drilled into the rectangular-shaped inner cladding layer following the practices of optical fiber pre-form fabrication. As shown in FIG. 4c, active cores elements 400, containing Er-doped glass, are fitted into the holes. As shown in FIG. 4d, the entire assembly is drawn, like an optical fiber, to form a multi-port amplifier fiber. The fiber is diced into a plurality of sections 410 (FIG. 4e), coated to form a pair of reflecting surfaces 412 (FIG. 4f), and then diced again into individual multi-port amplifiers 414 as finally shown in FIG. 4g.

Figure 5E:
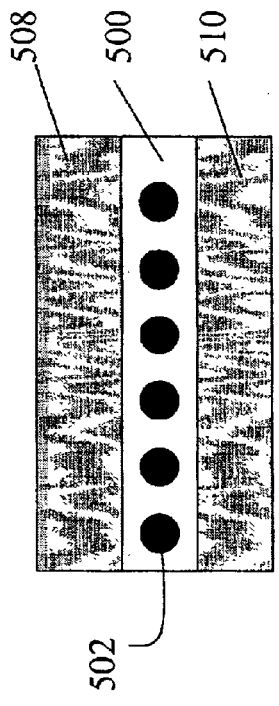
Figure 5F:
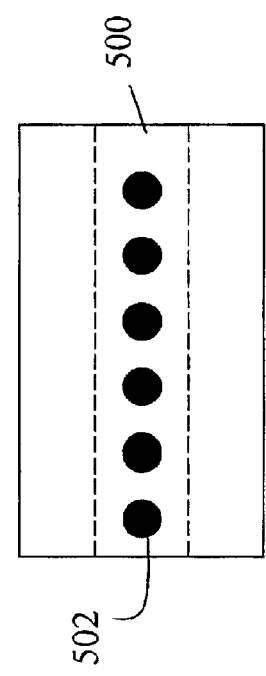
Figure 5G:
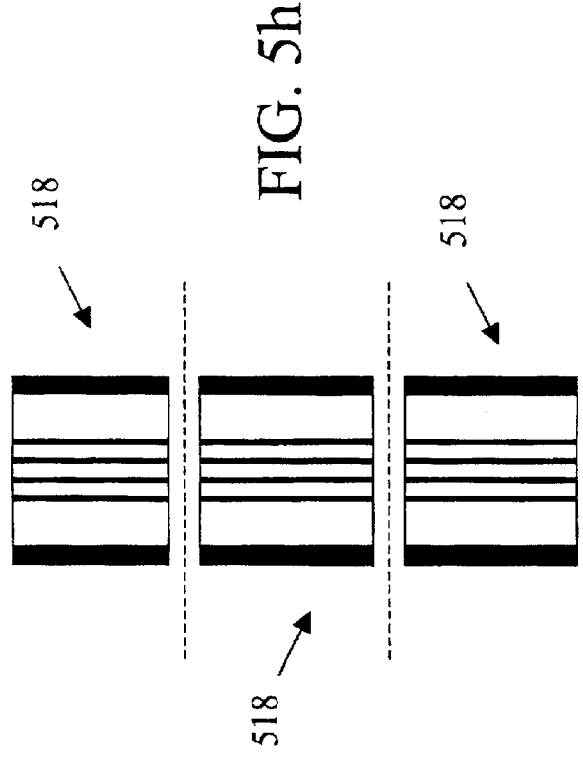
Figure 5H:
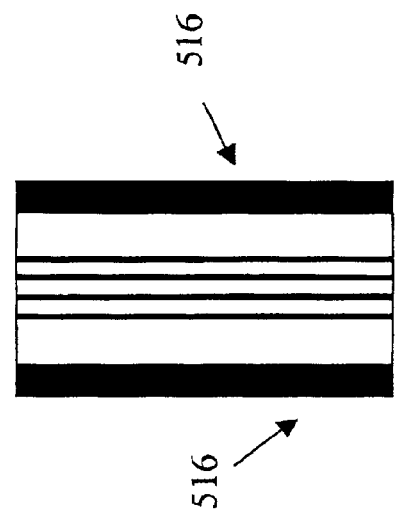

In a fourth embodiment, the inner cladding 500 and array of active core elements 502 are drawn from a single preform 506 and then sandwiched between outer cladding layers 508 and 510. As shown in FIG. 5a, preform glass structure 506 is produced consisting of inner cladding layer 500. An array of circular holes 512 is drilled into the rectangular-shaped inner cladding layer following the practices of optical fiber pre-form fabrication. As shown in FIG. 5b, the active cores elements 502, containing Er-doped glass, are fitted into the holes. As shown in FIG. 5c, the entire assembly is drawn, like an optical fiber and then diced into a number of pieces 514 (FIG. 5d). As shown in FIG. 5e, each drawn piece 514 is polished to a desired thickness, and the resulting inner cladding layer is sandwiched between outer cladding layers 508 and 510 to form the waveguide (FIG. 5f). Each piece is coated to form a pair of reflecting surfaces 516 (FIG. 5g) and diced again to form the individual multi-port amplifiers 518 (FIG. 5h).

Figure 6:
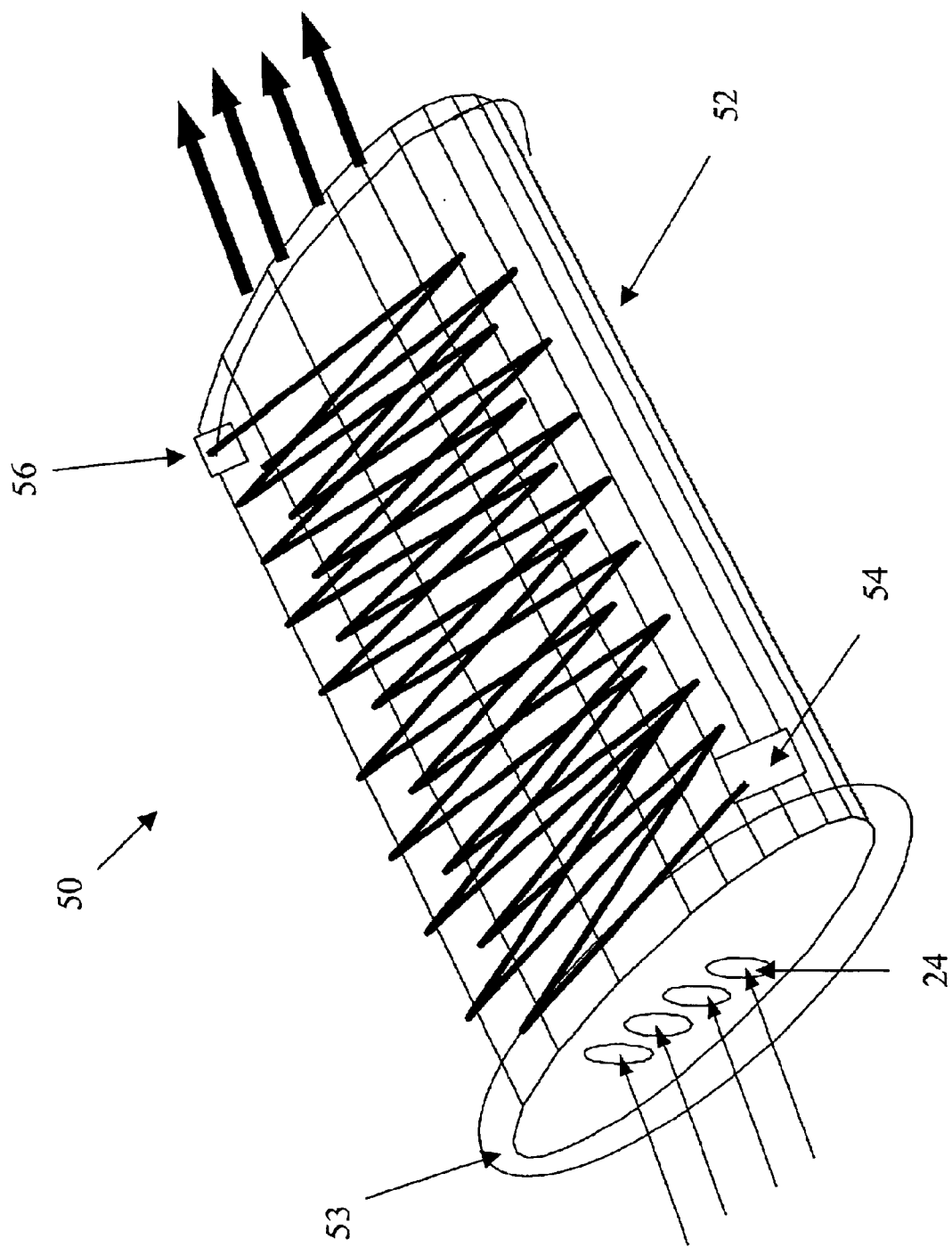
FIG. 6 is a schematic illustration of a multi-port optical amplifier according to a second embodiment of the invention.

FIG. 6 illustrates a second embodiment of a multi-port optical amplifier 50 according to this invention. The multi-port optical amplifier 50 has an inner cladding layer 52, an outer cladding layer 53 a plurality of active core elements 24, a first pump laser diode 52 and a second pump laser diode 54. Again, the multi-port optical amplifier 50 is not limited to having specifically two pump laser diodes. Configurations having one optical pump source and more than two optical pump sources are within the scope and spirit of this invention. The pump laser diodes 54 and 56 may be bar diode lasers in an embodiment of the invention.

The inner cladding layer 52 of the multi-port optical amplifier 50 has a curved surface. A surface that is substantially elliptical in its transverse cross-sectional dimension has been found to be suitable. However, the general aspects of the invention contemplate other types of curved surfaces tailored to the particular need.

Figure 7:
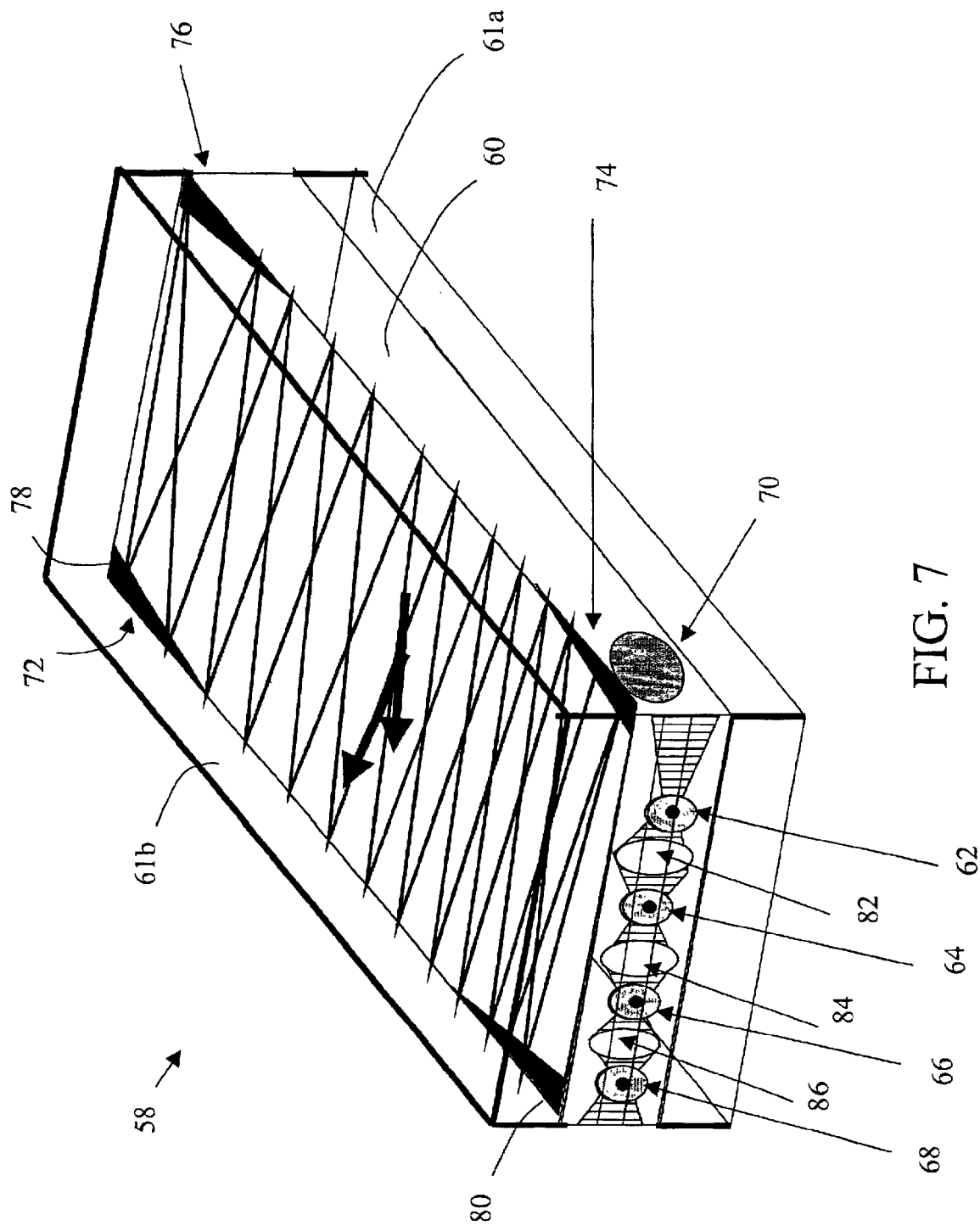
FIG. 7 is a schematic illustration of a multi-port optical amplifier according to a third embodiment of the invention.

FIG. 7 illustrates a third embodiment of a multi-port optical amplifier 58 according to this invention. The multi-port optical amplifier 58 has a inner cladding layer 60, outer cladding layers 61a and 61b, a plurality of active core elements 62, 64, 66 and 68, a first pump laser diode 70 and a second pump laser diode 72. The plurality of active core elements 62–68 and pump laser diode 72 may be selected according to the particular application with similar considerations as noted above in regard to the first and second embodiments. The inner cladding layer 60 has reflective surfaces similar to those of the inner cladding layer 22 of the first embodiment. In this embodiment, the inner cladding layer 60 has notched or curved corners 74, 76, 78 and 80 which causes pump light to reverse its direction along the longitudinal dimension of the inner cladding layer 60.

In operation, pump light emitted from the pump laser diode 70 is reflected back and forth transversely and in the longitudinal direction in a zigzag type of pattern. Once pump light from the first laser diode 70 reaches either notched or curved surface 76 or 78, it reverses its direction of travel along the longitudinal dimension, and again reflects back and forth in a transverse direction in a zigzag-like pattern in a reverse longitudinal direction. When the light reaches notched or curved surfaces 74 or 80, its longitudinal direction of travel is changed again, and so on. The pump light thus is reflected back and forth in the longitudinal and transverse directions substantially continuously until it is substantially all absorbed by the active core elements 62, 64, 66 and 68. Pump light from the second pump laser diode 72 follows a similar pattern, but in the reverse direction. The lines and heavy arrows in FIG. 7 schematically illustrate such a reflection pattern of the pump light.

The multi-port optical amplifier 58 has a plurality of focusing elements 82, 84 and 86 between adjacent active core elements. The optical gain signal elements 62, 64, 66 and 68 lie substantially within a plane and stretch substantially linearly along the longitudinal dimension of the inner cladding layer 60. Similarly, the focusing elements 82, 84 and 86 are substantially within a plane, which coincides with the plane of the plurality of active core elements 62, 64, 66 and 68. The general concepts of the invention are not limited to such a configuration, but the inventors have achieved good results with such a configuration. The focusing elements 82, 84 and 86 are refractive elements in this embodiment. In particular, the focusing elements 82, 84 and 86 are optical fibers, which have substantially uniform refractive indices throughout. The optical fibers 82, 84 and 86 act as cylindrical lenses in this case to focus pump light into the neighboring active core elements. The inventors have found that inner cladding layers typically 80–125 $\mu$m thick are suitable. One may select the focusing elements 82, 84 and 86 to have larger cross-sectional diameters than the active core elements, but this invention is not limited to such a configuration. Furthermore, one should recognize from the teachings herein that various types of doped optical fibers having various refractive index profiles could be substituted for the optical fibers having uniform refractive index profiles without departing from the scope and spirit of this invention.

The focusing elements 82, 84 and 86 in the embodiment illustrated in FIG. 7 are refractive elements. However, the invention contemplates focusing elements generally, including non-refractive focusing elements, within the scope of the invention. There may be diffractive optical elements or holographic elements formed proximate the active core elements 62, 64, 68 and 70. There also may be gradient refractive index lenses (GRIN lenses) arranged as individual components or formed by a non-uniform material of the inner cladding layer 60 proximate the active core elements 62, 64, 68 and 70. Furthermore, electro-optic elements, which change their optical properties such as refractive and/or absorption properties according to applied voltages may also be used. Focusing elements may be used with the various different configurations for the inner cladding layer, for example, with the inner cladding layer 52 of the second embodiment.

In operation, pump light from the pump laser diodes 70 and 72 are coupled into the inner cladding layer 60 and is reflected back and forth transversely and back and forth longitudinally until it is absorbed by the active core elements 62, 64, 66 and 68. The focusing elements 82, 84 and 86 focus pump light onto the neighboring active core elements thus enhancing coupling of the pump light into the active core elements. Pump light absorbed by the active core elements 62, 64, 66 and 68 cause population inversion of an active material in the corresponding active core element. The active core elements 62, 64, 66 and 68 may contain additional materials that enhance the population inversion of the active material. A primary ingredient of the active core elements 62, 64, 66 and 68 may enhance population of a metastable state in the active materials through phonon coupling. Phosphate glass is a suitable material in combination with erbium for use in the 1550 nm optical communication band. Ytterbium is another material that acts to enhance population inversion in the case of the phosphate glass doped with erbium. Ytterbium absorbs pump light and exchanges energy to the erbium to enhance the population of the metastable state.

Optical signals that are coupled into the active core elements 62, 64, 66 and 68 are transmitted along respective signal paths along each of the active core elements. Suitable active core elements 62, 64, 66 and 68 are phosphate glass fibers in which phosphate is a primary ingredient doped with erbium as the active ingredient. Phosphate glass fibers co-doped with ytterbium and erbium are also suitable as active core elements for use in the 1550 nm optical communication band region. The optical signals traveling through the respective active core elements stimulate emission of photons from the excited state of the active material at substantially the same energy and substantially coherently with the stimulating photon, thus amplifying the optical signal. The optical signals then emerge from the opposing, output end of the active core elements 62, 64, 66 and 68 as amplified signals. The pump light coupled into the inner cladding layer 60 from the pump laser diodes 70 and 72 is substantially entirely absorbed by the active core elements 62, 64, 66 and 68.

Figure 8:
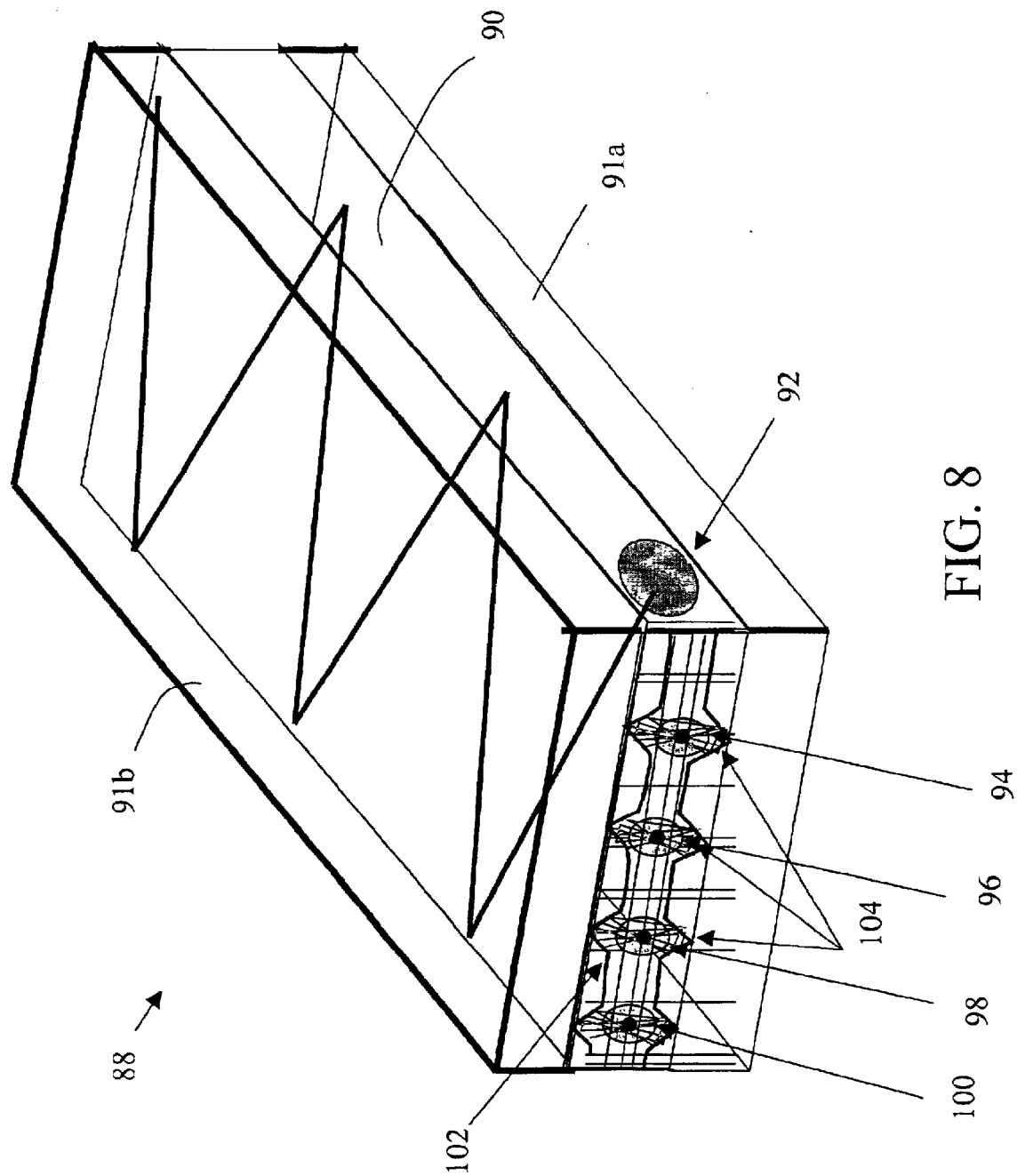
FIG. 8 is a schematic illustration of a multi-port optical amplifier according to a fourth embodiment of the invention.

FIG. 8 illustrates a portion of another embodiment of a multi-port optical amplifier 88 that has a inner cladding layer 90, outer cladding layers 91a and 91b, a pump laser diode 92 and active core elements 94, 96, 98 and 100. Similar to the above-described embodiments, this embodiment may have a second pump laser diode (not shown) at a laterally and transversely opposed end of the inner cladding layer 90. Surfaces 102 and 104 within the inner cladding layer are at least partially reflecting surfaces, which focus pump light onto the active core elements 94, 96, 98 and 100. Such reflecting surfaces may be achieved by providing an abrupt change in refractive index of the materials at the interface of the reflecting surfaces. The reflecting surfaces 102 and 104 again enhance coupling to the active core elements 94, 96, 98 and 100. The multi-port optical amplifier 88 otherwise operates similar to the previously described embodiments.

Figure 9:
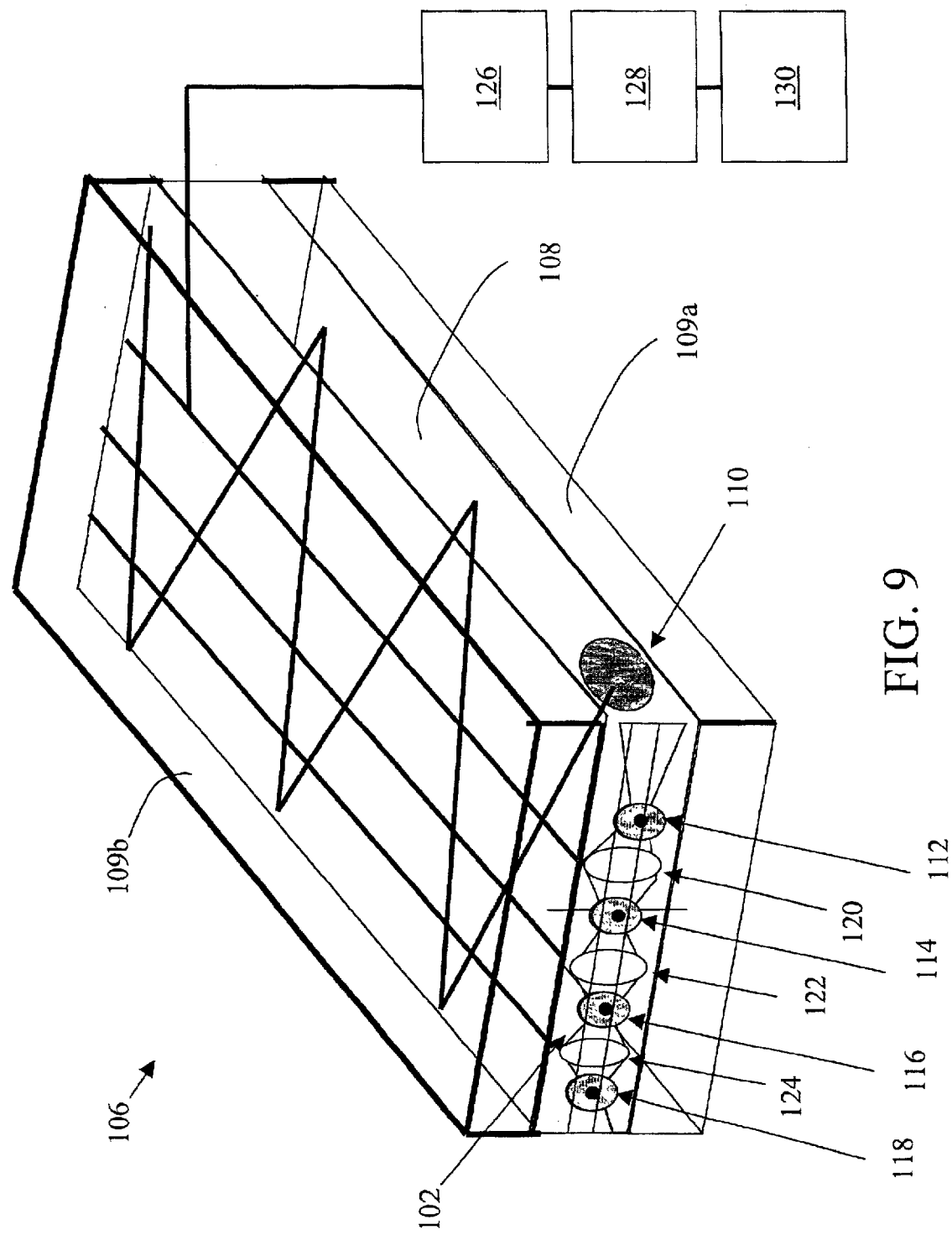
FIG. 9 is a schematic illustration of a multi-port optical amplifier according to a fifth embodiment of the invention.

FIG. 9 illustrates another embodiment of a multi-port optical amplifier 106 according to the invention. The multi-port optical amplifier 106 has an inner cladding layer 108, outer cladding layers 109a and 109b, a pump laser diode 110, and a plurality of active core elements 112, 114, 116 and 118. Only a portion of the multi-port optical amplifier 106 is shown in FIG. 9. The multi-port optical amplifier 106 will typically have a second pump laser source (not shown). As in the other embodiments, one or more than two pump light sources may be used in alternative embodiments.

The multi-port optical amplifier 106 has a plurality of gain control elements 120, 122, and 124. Suitable gain control elements change their optical properties in response to an applied voltage. FIG. 9 schematically illustrates a voltage source 126 attached to the gain control element 120. The gain control elements 122 and 124 would similarly be connected to either the same or different voltage source (not shown). A control unit 128 controls the applied voltage to the gain control element 120. The control unit may be in communication with an optical channel-monitoring device 130 illustrated schematically in FIG. 9.

The gain control elements 120, 122 and 124 may be selected from elements that change their absorption properties or refractive properties in response to an applied voltage. Examples of suitable gain control elements employ lithium niobate or a multiple quantum well device. Other examples include liquid crystal material and thermo-optic materials.

In operation, the multi-port optical amplifier 106 operates in a similar manner to the previously described embodiments except the gain control elements 120, 122 and 124 can individually control the amount of coupling of pump light to the active core elements 112, 114, 116 and 118. For example, the optical channel monitor 130 may determine that the input signals are not all at equal strengths, and may adjust the active core elements 120, 122 and 124 accordingly to achieve substantially equal strength signals at the output of the multi-port optical amplifier 106.

Figure 10:
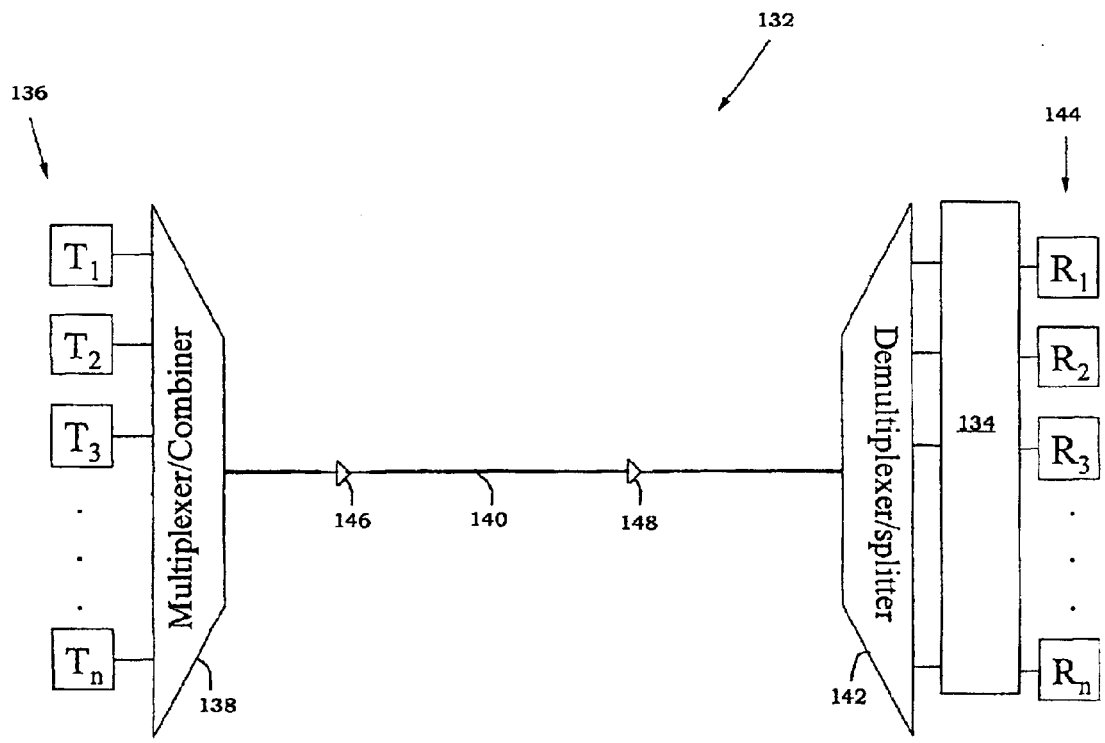
FIG. 10 is a schematic illustration of a wavelength division multiplexed optical communication system that includes a multi-port optical amplifier according to this invention.

FIG. 10 is a schematic illustration of a wavelength division multiplexed optical communication system 132 that includes a multi-port optical amplifier 134 according to the invention. The multi-port amplifier may be selected from one of the above-described embodiments or suitable modifications based on the teachings herein to adapt it to the particular application. The optical communication system 132 has a plurality of optical transmitters 136 which are in optical communication with an optical multiplexer 138, which multiplexes the plurality of optical signals into a single channel, which is transmitted on an optical transmission line 140. The optical transmission line 140 is typically a single mode optical fiber. The optical transmission line 140 is in optical communication with the demultiplexer 142, which demultiplexes the single channel into a plurality of separate optical channels to the multi-port optical amplifier 134. The multi-port optical amplifier 134 is in optical communication with a plurality of receivers 144. The optical communication system 132 may further include a plurality of optical amplifiers 146 and 148, for example, along the optical transmission line 140.

The optical communication system 132 has the multi-port optical amplifier 134 at a receiver end of the system. One could alternatively, or in addition, include a multi-port optical amplifier at the receiver end of the optical communication system 132. For example, a multi-port optical amplifier according to the current invention may be arranged between a plurality of transmitters 136 and the multiplexer 138. The optical communication system 132 may be a long haul system, or may be a short reach system and may be combined with additional systems and components.

The multi-port optical amplifier according to the current invention may be integrated with other optical components, for example, attached to a substrate along with other components. The multi-port optical amplifier may itself be considered an optical amplifier chip, which may be combined into various other sub-components of optical communications systems. For this application we can imagine that integration with an arrayed waveguide (AWG) could enable a loss-less or amplified wavelength (de)-multiplexer. Every passive optical component will have insertion loss. The amplifier chip could be used in any such application to compensate for these losses.

Figure 11:
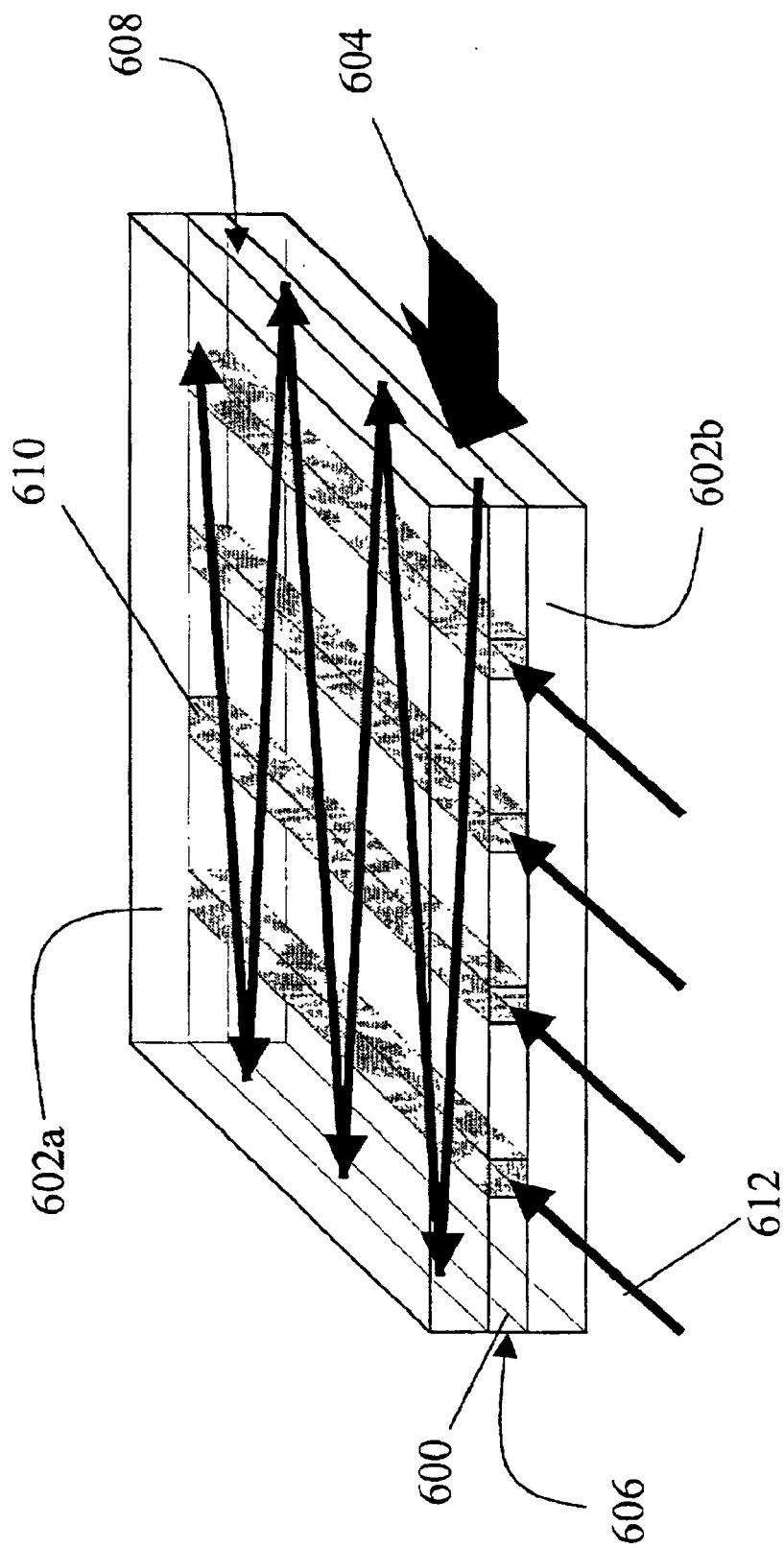
FIG. 11 is a schematic illustration of a single-mode multi-port optical amplifier in accordance with the present invention.

FIG. 11 illustrates an embodiment of the multi-port amplifier in which the waveguide is single mode (spatial). The waveguide formed by inner cladding layer 600 and outer cladding layers 602a and 602b serve to confine the pump light 604 as it reflects off reflecting surfaces 606 and 608 back-and-forth across the waveguide. The waveguide is configured to concentrate most of the pump light in the central part of the waveguide where the active core elements 610 lie. If the waveguide can be made thin enough (10 micron or less) and with appropriate cladding index, then the waveguide can be single mode (spatial). Thus the overlap of pump energy with the core will be optimized since the pump profile of the single mode will be concentrated in the central part of the waveguide with little pump light in the areas of the waveguide above and below the cores. As a result, the optical signals 612 will be amplified more efficiently.

The drawback to this configuration is that the mode profile seen by the optical signal as it propagates through the core elements is elliptical rather than circular. The elliptical profile is attributable to the different materials on either side of the core (the inner cladding layer) and above and below the core (the outer cladding layers), which necessarily have different refractive indices. The elliptical mode profile produces a coupling loss with conventional telecomm fiber due to mode mismatch. However, the gain attributable to concentrating the pump power in the active core elements more than offsets the coupling loss due to mode mismatch.

In one particular embodiment, active core elements 610 are formed of a phosphate glass host co-doped with 3 wt. % erbium and 15 wt. % ytterbium that exhibits refractive indices at 980 nm and 1.55 microns of $n_{980}$=1.534 and $n_{1550}$=1.5274, inner cladding layer 600 is formed of a Schott LLF2 glass that exhibits refractive indices at 980 nm, and 1.55 microns of $n_{980}$=1.528987 and $n_{1550}$=1.521741, and outer cladding layers 602a and 602b that are formed of Schott N-LLF6 glass that exhibit refractive indices at 980 nm, and 1.55 microns of $n_{980}$=1.52040 and $n_{1550}$-1.513024. Inner cladding layer 600 and active core elements 610 are 6 microns thick. Under these conditions, the waveguide is near-single mode at 980 nm for the pump signal with a numerical aperture (NA) of the inner cladding and core of 0.162 and 0.204, respectively, and is single-mode at 1550 nm for the input signal with numerical apertures of the fast and slow axis of 0.208 and 0.130, respectively. As a result, 97% of the pump energy hits the core with approximately 99.3% of the energy being coupled from the inner cladding layer into the active core elements.

Figure 12D:
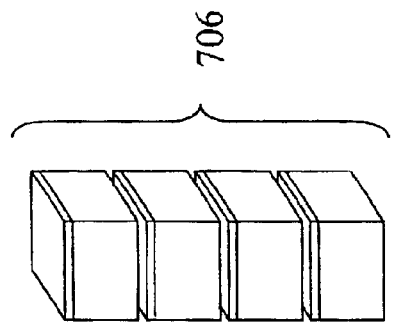
FIGS. 12a through 12j illustrate a method of manufacturing the single-mode multi-port amplifier shown in FIG. 11.
Figure 12C:
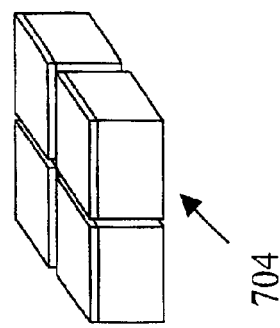
Figure 12B:
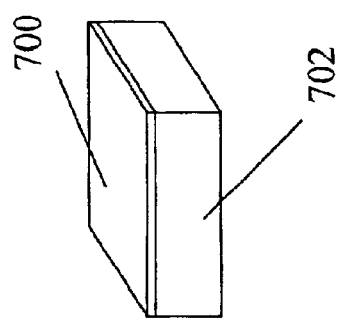
Figure 12A:
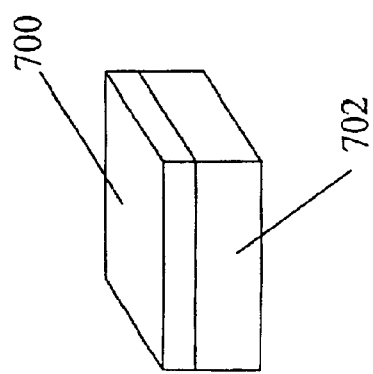
Figure 12H:
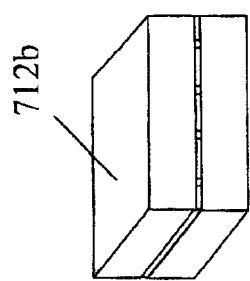
Figure 12G:
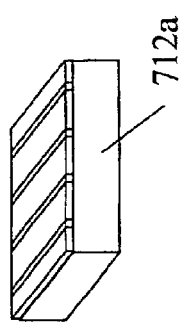
Figure 12F:
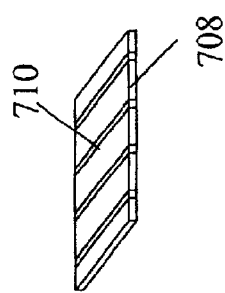
Figure 12E:
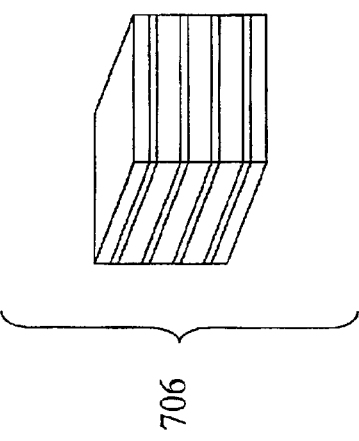
Figure 12I:
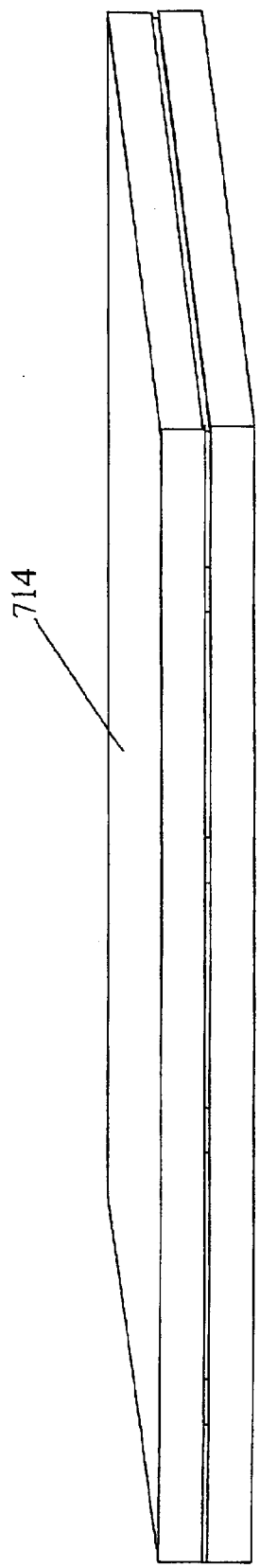
Figure 12J:
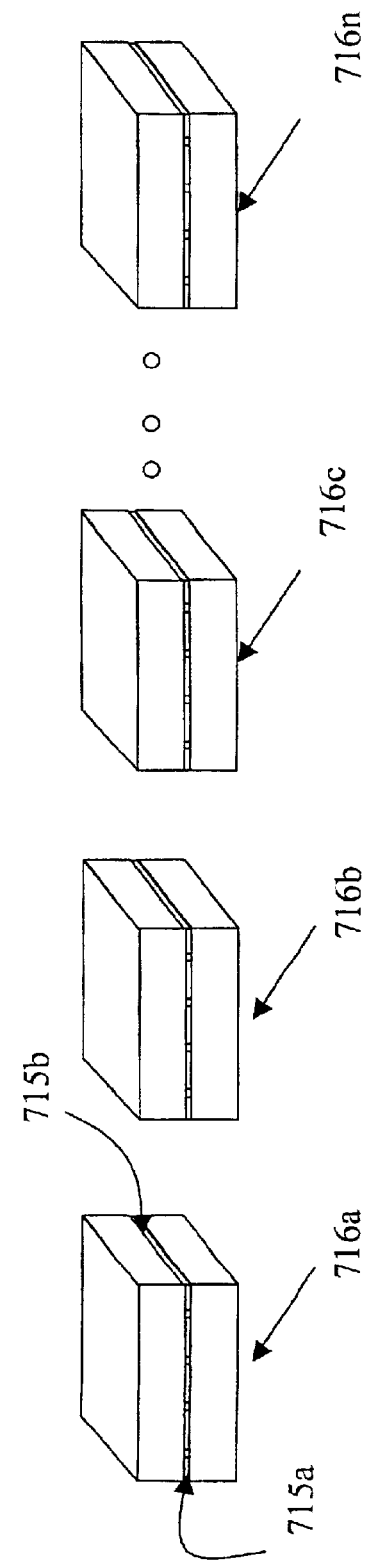

FIGS. 12a through 12j illustrates the steps for manufacturing the single-mode waveguide. As shown in FIG. 12a, a layer 700 of active core element material (10 cm×10 cm×1 mm) is bonded to a layer 702 of inner cladding layer material (10 cm×10 cm×12.2 mm). Layer 700 is then polished down to approximately 0.3 mm as shown in FIG. 12b. The assembly is then diced into cubes 704 (FIG. 12c), which are stacked one on top of another (FIG. 12d) and bonded together (FIG. 12e). The stack 706 is sliced vertically to form an inner cladding layer 708 with an embedded array of active core elements 710 (FIG. 12f). Inner cladding layer 708 is bonded to a first outer cladding layer 712a (FIG. 12g) and then a second outer cladding layer 712b (FIG. 12h). This preform 714 is then drawn or pulled to suitably approximately 2500 times its original length (FIG. 12i) and coated with a reflective material to form reflecting surfaces 715a and 715b. The preform is then diced into a large number of single-mode multi-port amplifiers 716a, 716b, . . . , 716n (FIG. 12j).

What is claimed is:

1. A multi-port optical amplifier chip comprising:
   an inner cladding layer;
   a pair of outer cladding layers formed on opposite surfaces of the inner cladding layer, said inner and outer cladding layers forming a pump waveguide having a transverse direction and a longitudinal direction;
   a plurality of active core elements arranged in the inner cladding layer, said active core elements having respective input ports for receiving optical signals and respective output ports for distributing amplified optical signals, said inner cladding layer and each said active core element forming a signal waveguide for confining the optical signal therein to propagate along an optical signal path between the active core element's input and output ports;
   a pump source arranged to direct pump light into the inner cladding layer in general alignment with the transverse direction of the pump waveguide to illuminate at least one said active core element along at least a portion of its optical signal path;
   a pair of reflecting surfaces arranged at opposing sides of the inner cladding layer to reflect pump light in the generally transverse direction, said reflecting surfaces redirecting at least a portion of pump light incident thereon to illuminate the active core elements along their optical signal paths thereby exciting the active core elements and amplifying the respective optical signals; and
   a focusing optical element disposed between said first and second active core elements, said focusing element concentrating pump light on at least one of said active core elements.

2. A multi-port optical amplifier according to claim 1, further comprising second and third focusing optical elements spaced apart with first and second active core elements and the first-mentioned focusing optical element disposed therebetween, said second and third focusing optical elements concentrating pump light on at least one of said first and second active core elements.

3. A multi-port optical amplifier according to claim 1, wherein said focusing optical element is a refractive optical element having a substantially uniform refractive index that is different from a refractive index of a material surrounding said focusing optical element.

4. A multi-port optical amplifier according to claim 2, wherein said second and third focusing optical elements are refractive optical elements, each said refractive optical element having a respective substantially uniform refractive index that is different from a refractive index of a material surrounding said focusing optical element.

5. A multi-port optical amplifier according to claim 3, wherein said refractive optical element is an optical fiber embedded in said optical material.

6. A multi-port optical amplifier according to claim 1, wherein said focusing optical element is a region of said inner cladding layer that has a gradient refractive index.

7. A multi-port optical amplifier according to claim 1, wherein said focusing optical element is a gradient refractive index lens.

8. A multi-port optical amplifier according to claim 1, wherein said focusing optical element is a diffractive optical element.

9. A multi-port optical amplifier according to claim 1, wherein said focusing optical element is a holographic element.

10. A multi-port optical amplifier according to claim 1, wherein said focusing optical element is an electro-optic lens adapted to be connected to a voltage source, wherein variations in voltage applied to said electro-optic lens causes variations in an amount of focusing of said focusing optical element.

11. A multi-port optical amplifier component according to claim 1, further comprising a plurality of focusing elements arranged in a spaced apart relation to each other and in a substantially planar configuration, wherein said plurality of active core elements are arranged spaced apart from each other and in a substantially planar configuration, and wherein said substantially planar configurations of said focusing elements and said active core elements substantially coincide and intermesh to provide an alternating planar configuration of focusing elements and active core elements.

12. A multi-port optical amplifier chip, comprising:
an inner cladding layer;
a pair of outer cladding layers formed on opposite surfaces of the inner cladding layer, said inner and outer cladding layers forming a pump waveguide having a transverse direction and a longitudinal direction;
a plurality of active core elements arranged in the inner cladding layer, said active core elements having respective input ports for receiving optical signals and respective output ports for distributing amplified optical signals, said inner cladding layer and each said active core element forming a signal waveguide for confining the optical signal therein to propagate along an optical signal path between the active core element's input and output ports;
a pump source arranged to direct pump light into the inner cladding layer in general alignment with the transverse direction of the pump waveguide to illuminate at least one said active core element along at least a portion of its optical signal path;
a pair of reflecting surfaces arranged at opposing sides of the inner cladding layer to reflect pump light in the generally transverse direction, said reflecting surfaces redirecting at least a portion of pump light incident thereon to illuminate the active core elements along their optical signal paths thereby exciting the active core elements and amplifying the respective optical signals; and a plurality of focusing elements arranged in a spaced apart relation to each other and in a substantially planar configuration, wherein said plurality of active core elements are arranged spaced apart from each other and in a substantially planar configuration, and wherein said substantially planar configurations of said focusing elements and said active core elements substantially coincide and intermesh to provide an alternating planar configuration of focusing elements and active core elements.

13. A multi-port optical amplifier chip, comprising:
an inner cladding layer;
a pair of outer cladding layers formed on opposite surfaces of the inner cladding layer, said inner and outer cladding layers forming a pump waveguide having a transverse direction and a longitudinal direction;
a plurality of active core elements arranged in the inner cladding layer, said active core elements having respective input ports for receiving optical signals and respective output ports for distributing amplified optical signals, said inner cladding layer and each said active core element forming a signal waveguide for confining the optical signal therein to propagate along an optical signal path between the active core element's input and output ports;
a pump source arranged to direct pump light into the inner cladding layer in general alignment with the transverse direction of the pump waveguide to illuminate at least one said active core element along at least a portion of its optical signal path; and
a pair of reflecting surfaces arranged at opposing sides of the inner cladding layer to reflect pump light in the generally transverse direction, said reflecting surfaces redirecting at least a portion of pump light incident thereon to illuminate the active core elements along their optical signal paths thereby exciting the active core elements and amplifying the respective optical signals,
wherein each said active core element has first and second sides and top and bottom surfaces, said active core elements contacting said inner cladding layer along their first and second sides and said outer cladding layers along their top and bottom surfaces so that optical signals propagating therein see an elliptical mode profile.

14. A multi-port optical amplifier component according to claim 3, wherein the pump waveguide is single-mode at the pump wavelength.

15. A multi-port optical amplifier chip, comprising:
an inner cladding layer;
a pair of outer cladding layers formed on opposite surfaces of the inner cladding layer, said inner and outer cladding layers forming a pump waveguide having a transverse direction and a longitudinal direction;
a plurality of active core elements arranged in the inner cladding layer, said active core elements having respective input ports for receiving optical signals and respective output ports for distributing amplified optical signals, said inner cladding layer and each said active core element forming a signal waveguide for confining the optical signal therein to propagate along an optical signal path between the active core element's input and output ports;

a pump source arranged to direct pump light into the inner cladding layer in general alignment with the transverse direction of the pump waveguide to illuminate at least one said active core element along at least a portion of its optical signal path; and a pair of reflecting surfaces arranged at opposing sides of the inner cladding layer to reflect pump light in the generally transverse direction, said reflecting surfaces redirecting at least a portion of pump light incident thereon to illuminate the active core elements along their optical signal paths thereby exciting the active core elements and amplifying the respective optical signals, wherein each said active core element has first and second sides and top and bottom surfaces, said active core elements contacting said inner cladding layer along their first and second sides and said outer cladding layers along their top and bottom surfaces so that optical signals propagating therein see an elliptical mode profile.

16. A multi-port optical amplifier component according to claim 15, wherein the pump waveguide is single-mode at the pump wavelength.

* * * * *